United States Patent
He et al.

(10) Patent No.: US 11,696,359 B2
(45) Date of Patent: Jul. 4, 2023

(54) OVERRIDE OF DEFAULT BASE STATION DISCONTINUOUS RECEPTION CYCLE FOR INDIVIDUAL USER EQUIPMENT

(71) Applicant: QUALCOMM Incorporated, San Diego, CA (US)

(72) Inventors: Linhai He, San Diego, CA (US); Miguel Griot, La Jolla, CA (US); Gavin Bernard Horn, La Jolla, CA (US)

(73) Assignee: Qualcomm Incoporated, San Diego, CA (US)

( * ) Notice: Subject to any disclaimer, the term of this patent is extended or adjusted under 35 U.S.C. 154(b) by 0 days.

(21) Appl. No.: 17/022,870

(22) Filed: Sep. 16, 2020

(65) Prior Publication Data

US 2021/0360731 A1 Nov. 18, 2021

Related U.S. Application Data

(60) Provisional application No. 63/026,541, filed on May 18, 2020.

(51) Int. Cl.
*H04W 76/28* (2018.01)
*H04W 68/00* (2009.01)
(Continued)

(52) U.S. Cl.
CPC .............. *H04W 76/28* (2018.02); *H04W 8/08* (2013.01); *H04W 24/08* (2013.01); *H04W 48/16* (2013.01); *H04W 68/005* (2013.01); *H04W 72/53* (2023.01)

(58) Field of Classification Search
CPC ....... H04W 76/28; H04W 8/08; H04W 24/08; H04W 48/16; H04W 68/005; H04W 72/0493
See application file for complete search history.

(56) References Cited

U.S. PATENT DOCUMENTS

| 2015/0215989 A1* | 7/2015 | Bangolae | H04L 5/0035 370/311 |
| 2016/0227447 A1* | 8/2016 | Hu | H04W 36/0022 |

(Continued)

FOREIGN PATENT DOCUMENTS

EP    3487259 A1    5/2019

OTHER PUBLICATIONS

Kim, Improving LTE/LTE-A UE Power Efficiency with Extended DRX Cycle, Sep. 2014, 2014 IEEE 80th Vehicular Technology Conference (VTC2014—Fall) (Year: 2014).*

(Continued)

*Primary Examiner* — Said M Elnoubi
(74) *Attorney, Agent, or Firm* — Shumaker & Sieffert, P.A.

(57) ABSTRACT

Aspects of the disclosure relate to a UE transmitting a request for a discontinuous reception (DRX) cycle of a first duration; receiving an indication that a DRX cycle having a second duration has been assigned to the UE by a core network component; receiving a system information block (SIB) from a base station, the SIB comprising: a default paging cycle, and an indication that override of the default is supported; entering an inactive state in which a transceiver of the UE is in a low power state; and causing, while the UE is in the inactive state, the transceiver to periodically enter a higher power state to monitor its paging channel at a periodicity based on the second duration. Other aspects, embodiments, and features are also claimed and described.

16 Claims, 10 Drawing Sheets

(51) Int. Cl.
H04W 48/16 (2009.01)
H04W 24/08 (2009.01)
H04W 8/08 (2009.01)
H04W 72/53 (2023.01)

(56) References Cited

U.S. PATENT DOCUMENTS

2018/0234917 A1* 8/2018 Kim .................. H04W 76/28
2018/0263012 A1   9/2018 Ryu et al.
2020/0322393 A1* 10/2020 Zhu .................. H04L 65/1104
2021/0092707 A1* 3/2021 Ryu .................... H04W 8/24

OTHER PUBLICATIONS

International Search Report and Written Opinion—PCT/US2021/032803—ISAEPO—dated Sep. 13, 2021.
Qualcomm Incorporated, "Clean up and evaluation/conclusion on issues with one solution" 3SA WG2 Meeting £109, Fukuoka, Japan, May 2015.
Qualcomm Incorporated, "Enhancements to I-DRX procedure" 3GPP TSG-RAN WG2 Meeting #106, Reno, USA, May 2019.

* cited by examiner

OVERRIDE OF DEFAULT BASE STATION DISCONTINUOUS RECEPTION CYCLE FOR INDIVIDUAL USER EQUIPMENT

PRIORITY CLAIM

This application claims priority to and the benefit of Provisional Patent Application No. 63/026,541, filed in the United States Patent and Trademark Office on May 18, 2020, the entire content of which is incorporated herein by reference as if set forth in its entirety and for all applicable purposes.

TECHNICAL FIELD

The technology described below relates generally to wireless communication systems, and more particularly, to altering a discontinuous reception (DRX) cycle for an individual user equipment. Embodiments can provide and enable techniques for overriding a default base station discontinuous reception cycle for individual user equipment.

INTRODUCTION

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication at a user equipment is disclosed. In a more particular example, the method includes transmitting, by a user equipment, a request for a discontinuous reception (DRX) cycle interval of a first duration, receiving, by the user equipment, an indication that a DRX cycle interval having a second duration has been assigned to the user equipment by a core network component, receiving, by the user equipment, a system information block (SIB) from a base station, the SIB comprising: a default paging cycle, and an indication that override of the default paging cycle is supported, entering, by the user equipment, an inactive state in which a transceiver of the user equipment is in a low power state, and causing, while the user equipment is in the inactive state and based on the indication that override of the default paging cycle is supported by the base station, the transceiver to periodically enter a higher power state to monitor its paging channel at a frequency based on the second duration.

In another example, a wireless communication device is disclosed. In a more particular example, the wireless communication device includes: a transceiver; memory; and a processor communicatively coupled to the transceiver and the memory, the processor configured to: transmit a request for a discontinuous reception (DRX) cycle interval of a first duration; receive an indication that a DRX cycle interval having a second duration has been assigned to the wireless communication device by a core network component; receive a system information block (SIB) from a base station, the SIB comprising: a default paging cycle; and an indication that override of the default paging cycle is supported; enter an inactive state in which the transceiver is in a low power state; and cause, while the wireless communication device is in the inactive state and based on the indication that override of the default paging cycle is supported by the base station, the transceiver to periodically enter a higher power state to monitor its paging channel at a periodicity based on the second duration.

In another more particular example, the wireless communication device includes: means for transmitting a request for a discontinuous reception (DRX) cycle interval of a first duration; means for receiving an indication that a DRX cycle interval having a second duration has been assigned to the user equipment by a core network component; means for receiving a system information block (SIB) from a base station, the SIB comprising: a default paging cycle; and an indication that override of the default paging cycle is supported; means for entering an inactive state in which a transceiver of the user equipment is in a low power state; and means for causing the transceiver to periodically enter a higher power state to monitor its paging channel at a periodicity based on the second duration while the wireless communication device is in the inactive state and based on the indication that override of the default paging cycle is supported by the base station.

In another example, a non-transitory processor-readable storage medium storing processor-executable programming is disclosed. In a more particular example, the processor-executable programming is for causing a processing circuit to: transmit a request for a discontinuous reception (DRX) cycle interval of a first duration; receive an indication that a DRX cycle interval having a second duration has been assigned to the user equipment by a core network component; receive a system information block (SIB) from a base station, the SIB comprising: a default paging cycle; and an indication that override of the default paging cycle is supported; cause a user equipment associated with the processing circuit to enter an inactive state in which a transceiver operably coupled to the processing circuit is in a low power state; and cause, while the user equipment wireless communication device is in the inactive state and based on the indication that override of the default paging cycle is supported by the base station, the transceiver to periodically enter a higher power state to monitor its paging channel at a periodicity based on the second duration.

In another example, a method of wireless communication at a core network component is disclosed. In a more particular example, the method includes receiving, from a user equipment, a request for a discontinuous reception (DRX) cycle interval of a first duration, assigning, to the user equipment, a DRX cycle interval having a second duration, transmitting, to the user equipment, an indication that the DRX cycle interval having the second duration has been assigned to the user equipment, and transmitting, to a base station in a registration area in which the user equipment is located, a paging message comprising: an indication that the DRX cycle interval having the second duration has been assigned to the user equipment, and an indication that override of a default paging cycle of the base station is permitted.

In another example, a core network component is disclosed. In a more particular example, the core network component includes: a network interface; memory; and a processor communicatively coupled to the transceiver and the memory, the processor configured to: receive, from a user equipment, a request for a discontinuous reception (DRX) cycle interval of a first duration; assign, to the user equipment, a DRX cycle interval having a second duration; transmit, to the user equipment, an indication that the DRX cycle interval having the second duration has been assigned to the user equipment; and transmit, to a base station in a registration area in which the user equipment is located, a paging message comprising: an indication that the DRX cycle interval having the second duration has been assigned to the user equipment, and an indication that override of a default paging cycle of the base station is permitted.

In another more particular example, the core network component includes: means for receiving a request for a discontinuous reception (DRX) cycle interval of a first duration from a user equipment; means for assigning a DRX cycle interval having a second duration to the user equipment; means for transmitting an indication that the DRX cycle interval having the second duration has been assigned to the user equipment to the user equipment; and means for transmitting a paging message to a base station in a registration area in which the user equipment is located, the paging message comprising: an indication that the DRX cycle interval having the second duration has been assigned to the user equipment, and an indication that override of a default paging cycle of the base station is permitted.

In another example, a non-transitory processor-readable storage medium storing processor-executable programming is disclosed. In a more particular example, the processor-executable programming is for causing a processing circuit to: receive a request for a discontinuous reception (DRX) cycle interval of a first duration from a user equipment; assign a DRX cycle interval having a second duration to the user equipment; transmit an indication that the DRX cycle interval having the second duration has been assigned to the user equipment to the user equipment; and transmit a paging message to a base station in a registration area in which the user equipment is located, the paging message comprising: an indication that the DRX cycle interval having the second duration has been assigned to the user equipment, and an indication that override of a default paging cycle of the base station is permitted.

In another example, a method of wireless communication at a base station is disclosed. The method includes broadcasting, by a base station, a system information block (SIB), the SIB comprising: a default paging cycle, and an indication that override of the default paging cycle is supported, receiving, from a core network component, a paging message comprising: an indication that the DRX cycle interval having the second duration has been assigned to the user equipment, and an indication that override of a default paging cycle of the base station is permitted, and paging, based on the indication that override of the default paging cycle is permitted, the user equipment periodically at a periodicity based on the second duration.

In another example, a scheduling entity is disclosed. In a more particular example, the scheduling entity includes: a transceiver; a network interface; memory; and a processor communicatively coupled to the transceiver and the memory, the processor configured to: broadcast, using the transceiver, a system information block (SIB), the SIB comprising: a default paging cycle; and an indication that override of the default paging cycle is supported; receive, from a core network component using the network interface, a paging message comprising: an indication that the DRX cycle interval having the second duration has been assigned to the user equipment; and an indication that override of a default paging cycle of the base station is permitted; and page, using the transceiver and based on the indication that override of the default paging cycle is permitted, the user equipment periodically at a periodicity based on the second duration.

In another more particular example, the scheduling entity includes: means for broadcasting a system information block (SIB), the SIB comprising: a default paging cycle; and an indication that override of the default paging cycle is supported; means for receiving a paging message from a core network component, the paging message comprising: an indication that the DRX cycle interval having the second duration has been assigned to the user equipment; and an indication that override of a default paging cycle of the base station is permitted; and means for paging the user equipment periodically at a periodicity based on the second duration.

In another example, a non-transitory processor-readable storage medium storing processor-executable programming is disclosed. In a more particular example, the processor-executable programming is for causing a processing circuit to: broadcast, using a transceiver, a system information block (SIB), the SIB comprising: a default paging cycle; and an indication that override of the default paging cycle is supported; receive, from a core network component using the network interface, a paging message comprising: an indication that the DRX cycle interval having the second duration has been assigned to the user equipment; and an indication that override of a default paging cycle of the base station is permitted; and page, using the transceiver and based on the indication that override of the default paging cycle is permitted, the user equipment periodically at a periodicity based on the second duration.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

While aspects and embodiments are described in this application by illustration to some examples, those skilled in the art will understand that additional implementations and use cases can come about in many different arrangements and scenarios. Innovations described herein can be implemented across many differing platform types, devices, systems, shapes, sizes, packaging arrangements. For example, embodiments and/or uses can come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations can occur. Implementations can range a spectrum from chip-level or modular components to non-modular, non-chip-level implementations and further to aggregate, distributed, or OEM devices or systems incorporating one or more aspects of the described innovations. In some practical settings, devices incorporating described aspects and features can also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein can be practiced in a wide variety of devices, chip-level components, systems, distributed arrangements, end-user devices, etc. of varying sizes, shapes and constitution.

Various concepts presented throughout this disclosure can be implemented across a broad variety of telecommunication systems, network architectures, and communication standards.

Figure 1:
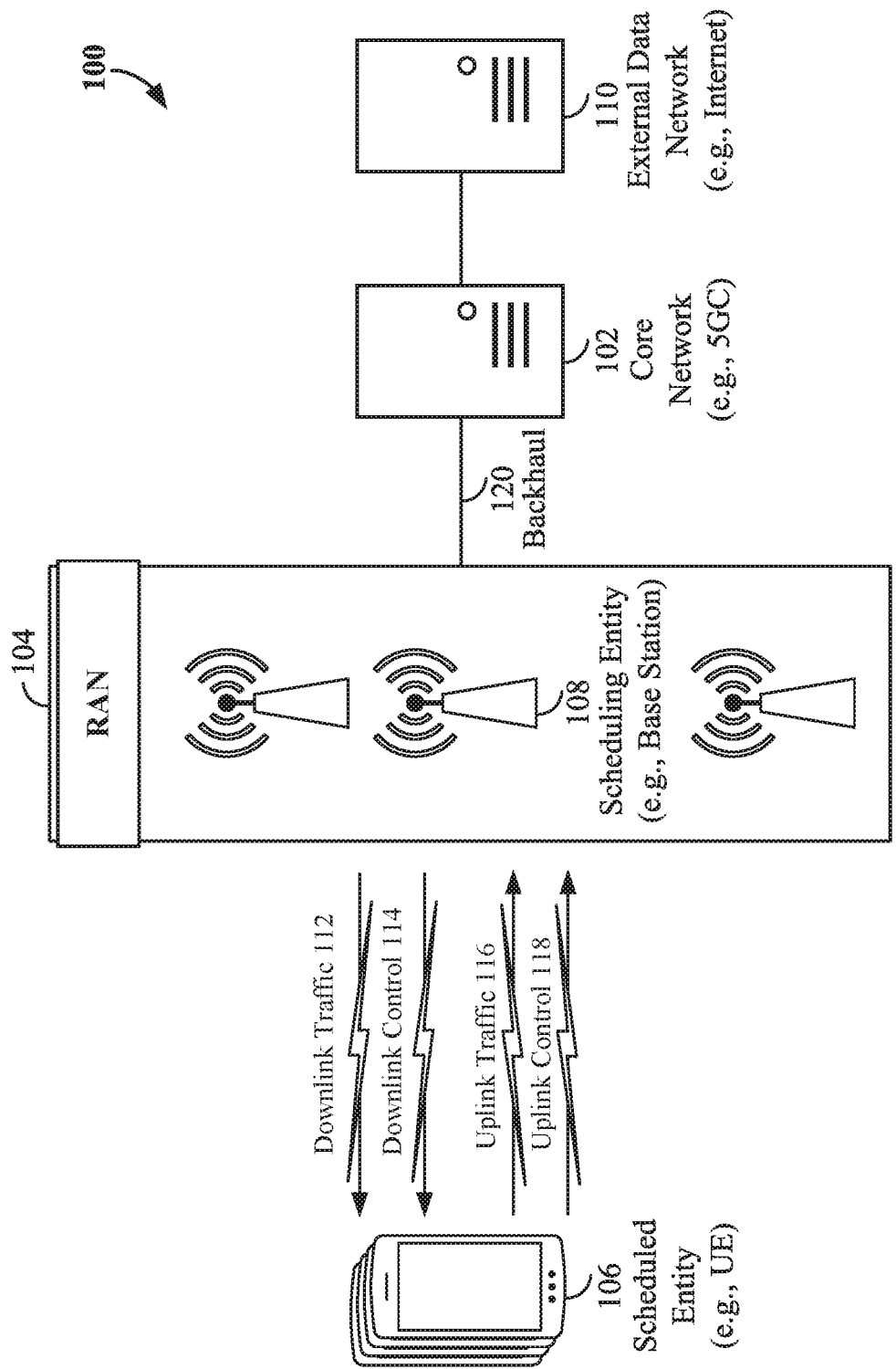
FIG. 1 is a schematic illustration of a wireless communication system in accordance with some aspects of the disclosed subject matter.

FIG. 1 is a schematic illustration of a wireless communication system 100 in accordance with some aspects of the disclosed subject matter, and is described as an illustrative example without limitation. In some aspects, wireless communication system 100 can include three interacting domains: a core network 102, a radio access network (RAN) 104, and a user equipment (UE) 106. In some aspects, by virtue of wireless communication system 100, UE 106 can be enabled to carry out data communication with an external data network 110, such as (but not limited to) the Internet.

In some aspects, RAN 104 can implement any suitable wireless communication technology or combination of technologies to provide radio access to UE 106. For example, RAN 104 can operate according to 3rd Generation Partnership Project (3GPP) New Radio (NR) specifications, which is sometimes referred to as 5G NR or simply 5G. As another example, RAN 104 can operate under a hybrid of 5G NR and Evolved Universal Terrestrial Radio Access Network (eU-TRAN) standards, which is sometimes referred to as LTE. The 3GPP refers to this hybrid RAN as a next-generation RAN, or NG-RAN. Of course, many other examples can be utilized in connection with the subject matter disclosed herein without departing from the scope of the present disclosure.

As illustrated in the example of FIG. 1, RAN 104 includes various base stations 108. Broadly, a base station can be used to implement a network element in a radio access network responsible for radio transmission and reception in one or more cells to or from a UE, such as UE 106. In different technologies, standards, and/or contexts, various terminology has been used to refer to a network elements that act as a base station. For example, a base station can also be referred to by those skilled in the art using various terminology to refer to a network element that connects one or more UE apparatuses to one or more portions of core network 102, such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In some aspects, as illustrated in FIG. 1, RAN 104 can support wireless communication for multiple mobile apparatuses. A mobile apparatus can be referred to as user equipment (UE) in 3GPP standards, but can also be referred to by those skilled in the art using various terminology to refer to a network element that provides a user with access to one or more network services, such as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In general, a UE can be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs can include a number of hardware structural components sized, shaped, and arranged to facilitate communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus can additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health and/or fitness tracker, a digital audio player (e.g., MP3 player), a camera, a game console, etc. A mobile apparatus can additionally be a digital home device or smart home device such as a home audio device, a home video device, and/or a home multimedia device, an appliance, a vending machine, intelligent lighting, a home security system, a smart meter, etc. A mobile apparatus can additionally be a smart energy device, a security device, a solar panel and/or solar array, a municipal infrastructure device controlling electric power (e.g., a smart grid), a municipal infrastructure device controlling lighting, a municipal infrastructure device controlling water, etc.; an industrial automation and enterprise device; a logistics controller; agricultural equipment; military defense equipment, vehicles, aircraft, ships, weaponry, etc. Still further, a mobile apparatus can provide for connected medicine or telemedicine support, e.g., health care at a distance. Telehealth devices can include telehealth monitoring devices and telehealth administration devices, whose communication may be given preferential treatment or prioritized access over other types of information (e.g., in terms of prioritized access for transport of critical service data, and/or relevant QoS for transport of critical service data).

In some aspects, wireless communication between RAN 104 and UE 106 illustrated in FIG. 1 can be described as utilizing an air interface. Transmissions over the air interface from a base station (e.g., base station 108) to one or more UEs (e.g., UE 106) can be referred to as downlink (DL) transmission. In accordance with some aspects of the disclosed subject matter, the term downlink can refer to a point-to-multipoint transmission originating at a scheduling entity (e.g., base station 108). For example, a downlink can be implemented using one or more broadcast channel multiplexing techniques. In some aspects, transmissions from a UE (e.g., UE 106) to a base station (e.g., base station 108) can be referred to as uplink (UL) transmissions. In accordance with some aspects of the disclosed subject matter, the term uplink can refer to a point-to-point transmission originating at a scheduled entity (e.g., UE 106).

In some aspects, access to the air interface can be scheduled, wherein a scheduling entity (e.g., a base station of RAN 104, such as base station 108) allocates resources for communication among some or all devices and equipment within its service area or cell. For example, as described below in connection with FIGS. 9 and 10, the scheduling entity can be responsible for scheduling, assigning, reconfiguring, and releasing resources for one or more scheduled entities. In such an example, for scheduled communication scheduled entities (e.g., UEs 106) can utilize resources allocated by a scheduling entity (e.g., base station 108).

In some aspects, base stations 108 are not the only entities that can function as scheduling entities. For example, in some aspects, a UE can function as a scheduling entity, scheduling resources for one or more scheduled entities (e.g., one or more other UEs).

As illustrated in FIG. 1, in some aspects, a scheduling entity (e.g., base station 108) can broadcast downlink traffic 112 to one or more scheduled entities (e.g., UEs 106). Broadly, in some aspects, a scheduling entity (e.g., base station 108) can act as a node or device responsible for scheduling traffic in a wireless communication network, including downlink traffic 112 and, in some examples, uplink traffic 116 from one or more scheduled entities (e.g., UEs 106) to the scheduling entity (e.g., base station 108). Additionally, a scheduled entity (e.g., UE 106) can act a node or device that receives downlink control information 114, which can include (but is not limited to) scheduling information (e.g., a grant), synchronization or timing information, and/or other control information from another entity in the wireless communication network such as the scheduling entity (e.g., base station 108).

In general, in some aspects, base stations 108 can include a backhaul interface for communication with a backhaul portion 120 of the wireless communication system. In some aspects, backhaul 120 can provide a link between a particular base station and core network 102. Further, in some examples, a backhaul network (e.g., including backhaul 120) can provide interconnection between various base stations 108. Various types of backhaul interfaces can be employed, such as a direct physical connection, a virtual network, and/or any other suitable connection, using any suitable transport network.

In some aspects, core network 102 can be a part of the wireless communication system 100, and can be independent of the radio access technology used in RAN 104. In some aspects, core network 102 can be configured according to 5G standards (e.g., 5GC). Additionally or alternatively, in some aspects, core network 102 can be configured according to a 4G evolved packet core (EPC), or any other suitable standard or configuration.

In some aspects, UE 106 can simultaneously connect to multiple base stations 108 and/or can connect to a single base station 108 using multiple component carriers (e.g., at different frequencies) to increase the bandwidth available for communications to and/or from UE 106.

Figure 2:
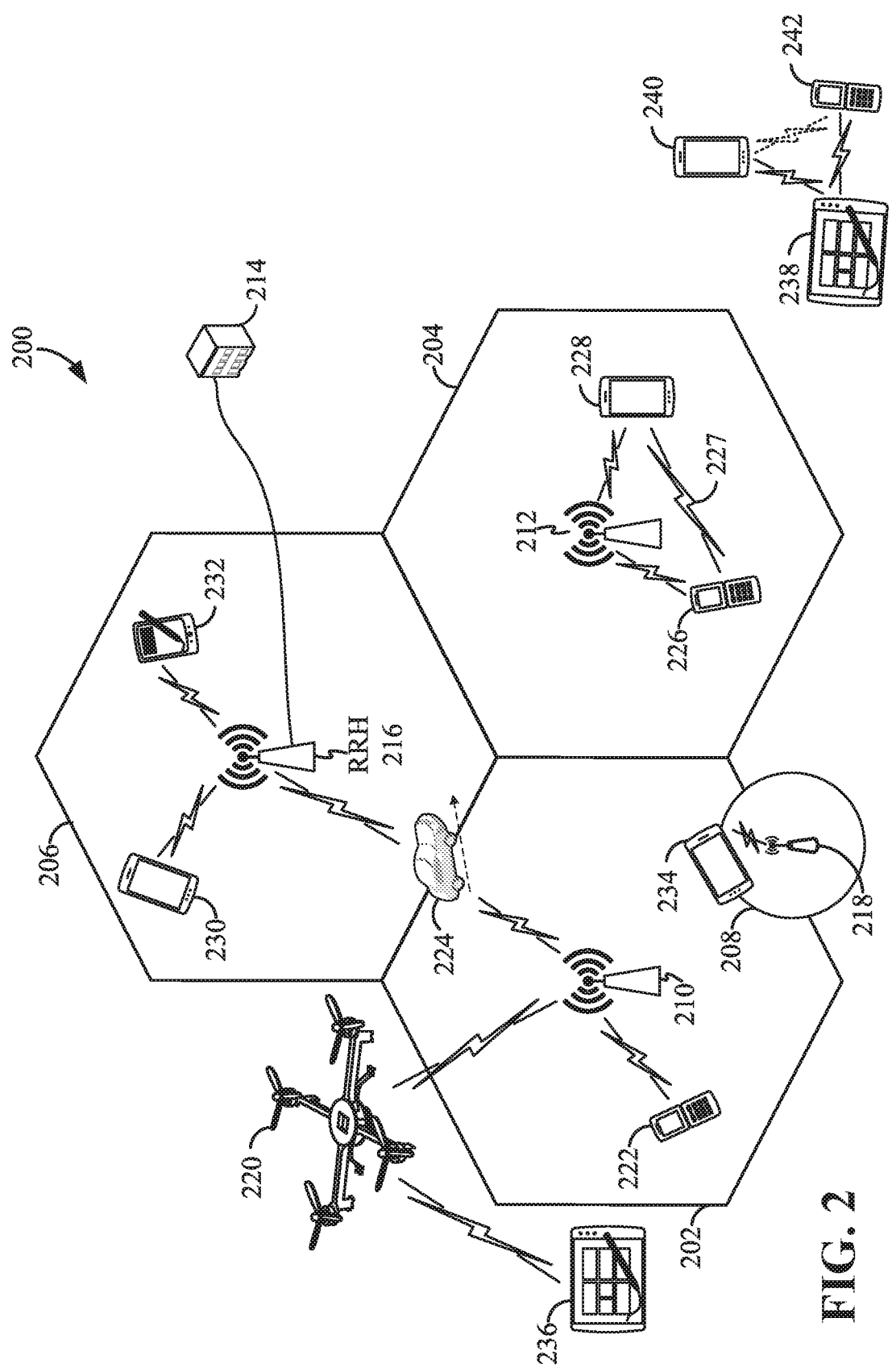
FIG. 2 is a conceptual illustration of an example of a radio access network in accordance with some aspects of the disclosed subject matter.

FIG. 2 is a conceptual illustration of an example of a radio access network 200 in accordance with some aspects of the disclosed subject matter, and is described as an illustrative example without limitation. In some aspects, RAN 200 can be an implementation of RAN 104 described above in connection with, and illustrated in, FIG. 1. In some aspects, the geographic area covered by RAN 200 can be divided into cellular regions (cells) that can be uniquely identified by a user equipment (UE) based on an identification broadcasted from one access point or base station. FIG. 2 illustrates macrocells 202, 204, and 206, and a small cell 208, each of which can include one or more sectors (not shown). For example, a sector can be defined as a sub-area of a cell, and all sectors within one cell can be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are illustrated in cells 202 and 204; and a third base station 214 is shown controlling a remote radio head (RRH) 216 in cell 206. That is, a base station can have an integrated antenna or can be connected to an antenna or RRH by feeder cables. In the illustrated example, cells 202, 204, and 206 can be referred to as macrocells, as base stations 210, 212, and 214 support cells having a relatively large size. Further, a base station 218 is shown in small cell 208 (which can be referred to, for example, as a microcell, picocell, femtocell, home base station, home Node B, home eNode B, etc.) which can overlap with one or more macrocells. In the example illustrated in FIG. 2, cell 208 can be referred to as a small cell, as base station 218 supports a cell having a relatively small size. In some aspects, cell sizing can be done according to system design as well as component constraints.

It is to be understood that radio access network 200 can include any number of wireless base stations and cells. Further, a relay node can be deployed to extend the size or coverage area of a given cell. Additionally, base stations 210, 212, 214, 218 can provide wireless access points to a core network for any number of mobile apparatuses. In some examples, base stations 210, 212, 214, and/or 218 can be particular implementations of base station 108 described above in connection with, and illustrated in, FIG. 1.

FIG. 2 further includes a quadcopter 220 (which is sometimes referred to as a drone), which can be configured to function as a base station. That is, in some examples, a cell may not necessarily be stationary, and the geographic area of the cell can move according to the location of a mobile base station such as quadcopter 220.

Within RAN 200, the cells may include UEs that may be in communication with one or more sectors of each cell. Further, each base station 210, 212, 214, 218, and 220 can be configured to provide an access point to a core network 102 (e.g., as described above in connection with FIG. 1) for all the UEs in the respective cells. For example, UEs 222 and 224 can be in communication with base station 210; UEs 226 and 228 can be in communication with base station 212; UEs 230 and 232 can be in communication with base station 214 by way of RRH 216; UE 234 can be in communication with base station 218; and UE 236 can be in communication with mobile base station 220. In some examples, UEs 222, 224, 226, 228, 230, 232, 234, 236, 238, 240, and/or 242 can be particular implementations of UE 106 described above in connection with, and illustrated in, FIG. 1.

In some examples, a mobile network node (e.g., quadcopter 220) can be configured to function as a UE. For example, quadcopter 220 can operate within cell 202 by communicating with base station 210.

In some aspects, sidelink signals can be used between UEs without necessarily relying on scheduling or control information from a base station. For example, two or more UEs (e.g., UEs 226 and 228) can communicate with each other using peer to peer (P2P) or sidelink signals without relaying that communication through a base station (e.g., base station 212). In another example, UE 238 is illustrated communicating with UEs 240 and 242. In such an example, UE 238 can function as a scheduling entity or a primary sidelink device, and UEs 240 and 242 can function as scheduled entities or a non-primary (e.g., secondary) sidelink device. In yet another example, a UE can function as a scheduling entity in a device-to-device (D2D), peer-to-peer (P2P), vehicle-to-vehicle (V2V) network, and/or in a mesh network. In a mesh network example, UEs 240 and 242 can optionally communicate directly with one another in addition to communicating with a scheduling entity (e.g., UE 238). Thus, in a wireless communication system with scheduled access to time—frequency resources and having a cellular configuration, a P2P configuration, and/or a mesh configuration, a scheduling entity and one or more scheduled entities may communicate utilizing the scheduled resources.

In some aspects, the ability for a UE to communicate while moving, independent of its location (e.g., within radio access network 200), can be referred to as mobility. The various physical channels between the UE and the radio access network can generally be set up, maintained, and released under the control of an access and mobility management function (AMF, not illustrated, which can be provided via core network 102, which is described above in connection with FIG. 1), which can include a security context management function (SCMF) that manages the security context for both the control plane and the user plane functionality, and a security anchor function (SEAF) that performs authentication.

In some aspects, a UE can enter an idle state (sometimes referred to as RRC_IDLE) or an inactive state (sometimes referred to as RRC_INACTICE) in which power consumption can be reduced by powering down one or more components (e.g., components of a reception chain) and periodically powering the one or more components on to determine whether a paging message has been directed to the UE. In general, the UE can power on such components at a predetermined frequency or periodicity, which can be referred to as a discontinuous reception (DRX) cycle, or idle/inactive DRX (I-DRX). In general, a UE can use its UE identifying information (UE ID) to determine the paging frame and paging occasion (PF/PO) at which it can expect to receive a paging message. There are typically two parameters that can be used to control the DRX cycle at which the UE powers on to check for paging messages: the RAN paging cycle, which can be cell specific, and a DRX cycle that has been negotiated between the UE and the core network (e.g., with the AMF) during a registration procedure. As described below in connection with FIGS. 7-10, if a base station does not support mechanisms described herein for overriding the RAN paging cycle, the UE and base station can use either the RAN paging cycle or the DRX cycle that has been assigned to the UE by the core network, whichever is shorter. Otherwise, if a base station does support mechanisms described herein for overriding the RAN paging cycle, the UE and base station can use the DRX cycle that has been assigned to the UE by the core network even though the DRX cycle exceeds the duration of the default RAN paging cycle. Permitting the UE to use a DRX cycle that is longer than the RAN paging cycle can be advantageous in certain applications. For example, when a UE is in an inactive state (e.g., in a do not disturb mode, in a mode in which transmissions and/or synchronous communications are not expected, etc.), paging latency can be relaxed and allowing the UE to utilize a longer DRX cycle can save power. In such an example, existing techniques for very long paging cycles (e.g., used by some internet-of-things devices) can be unsuitable as the UE may be required to maintain some level of connectivity (e.g., to receive emergency communications, to receive permitted communications, to perform mobility operations, etc.).

In some aspects, when a UE is in an idle or inactive state, paging can allow the network to reach the UE through paging messages that can be transmitted at the DRX cycle interval. Such paging messages can be used to notify UEs in an idle, inactive, and/or connected (e.g., active) state of system information changes and other indications, such as emergency warning messages (e.g., earthquake and tsunami warning system messages, commercial mobile alert system messages). The UE can monitor paging channels for any core network initiated paging messages in the idle state at the DRX cycle, and can monitor paging channels for any RAN initiated paging messages in the inactive state at the DRX cycle.

Figure 3:
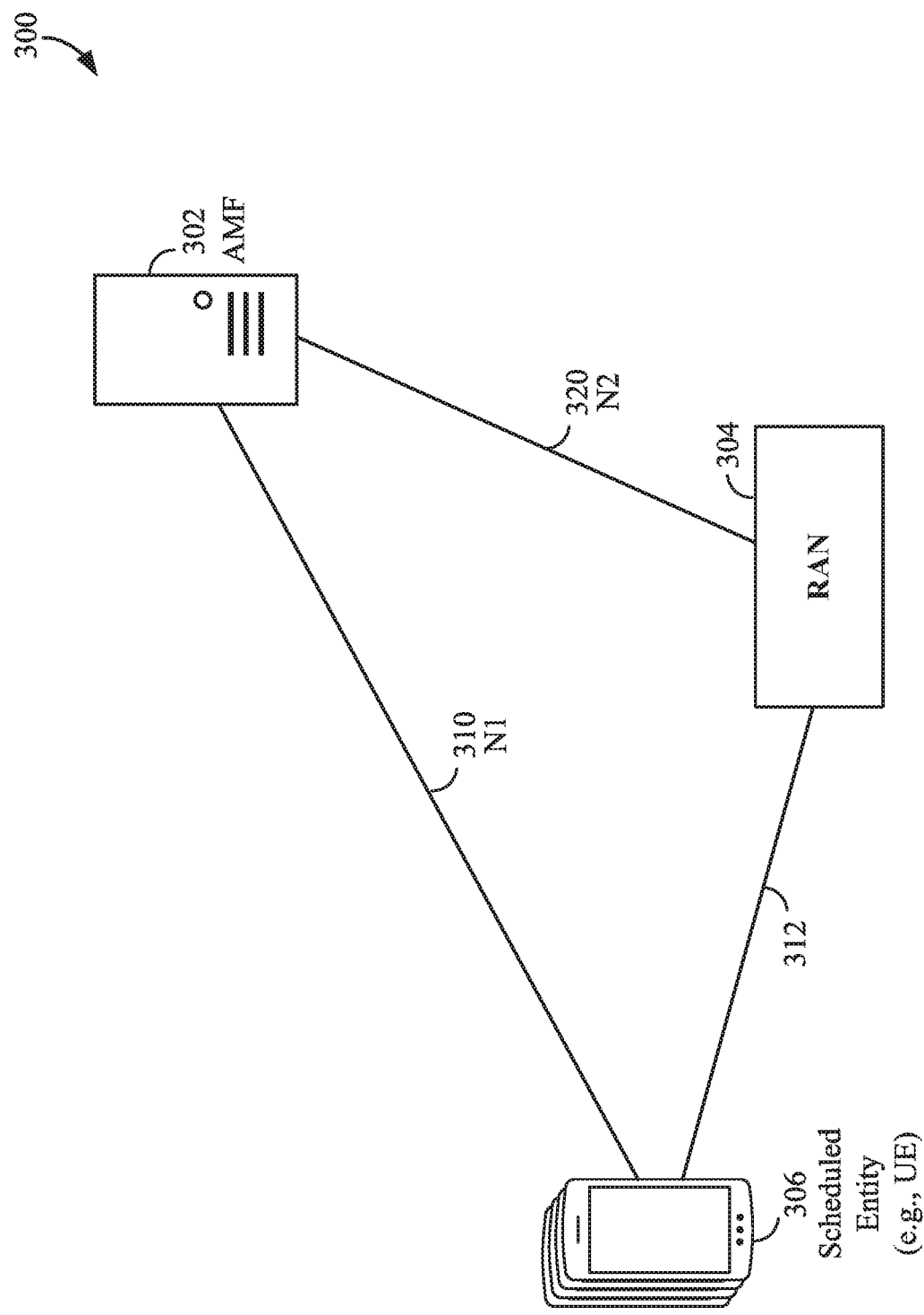
FIG. 3 is a conceptual illustration of logical connections between portions of wireless communication system in accordance with some aspects of the disclosed subject matter.

FIG. 3 is a conceptual illustration of logical connections between portions of a wireless communication system 300 in accordance with some aspects of the disclosed subject matter, and is described as an illustrative example without limitation. In some aspects, wireless communication system 300 can include three interacting domains: a core network (CN) that can include one or more access and mobility management function nodes (AMF) 302, a radio access network (RAN) 304, and a user equipment (UE) 306. In some aspects, a connection 310 can represent a logical interface between UE 306 and AMF 302, which can be referred to as an N1 interface. In some aspects, a connection 320 can represent a logical and/or network interface between RAN 304 and AMF 302, which can be referred to as an N2 interface. In some aspects, a connection 312 can represent an air interface between UE 306 and RAN 304 (e.g., one or more base stations within RAN 304). In some aspects, air interface 312 and N2 interface 320 can be used as network interfaces over which the logical connection represented by N1 interface 310 can be formed between UE 306 and AMF 302.

In some aspects, N1 interface 310 can be used by UE 306 and AMF 302 to exchange non-access stratum (NAS) messages between UE 306 and AMF 302. For example, NAS messages can be used to send registration requests when UE 306 attempts to access a new registration area, and to receive registration accept messages indicating that AMF 302 has accepted registration of UE 306 within the registration area.

In some aspects, N2 interface 320 can be used by RAN 304 and AMF 302 to exchange control plane messages, such as messages related to mobility of a UE (e.g., UE 306), messages related to changes in system information (e.g., transmitted via paging messages), and messages related to a UE context management.

Figure 4:
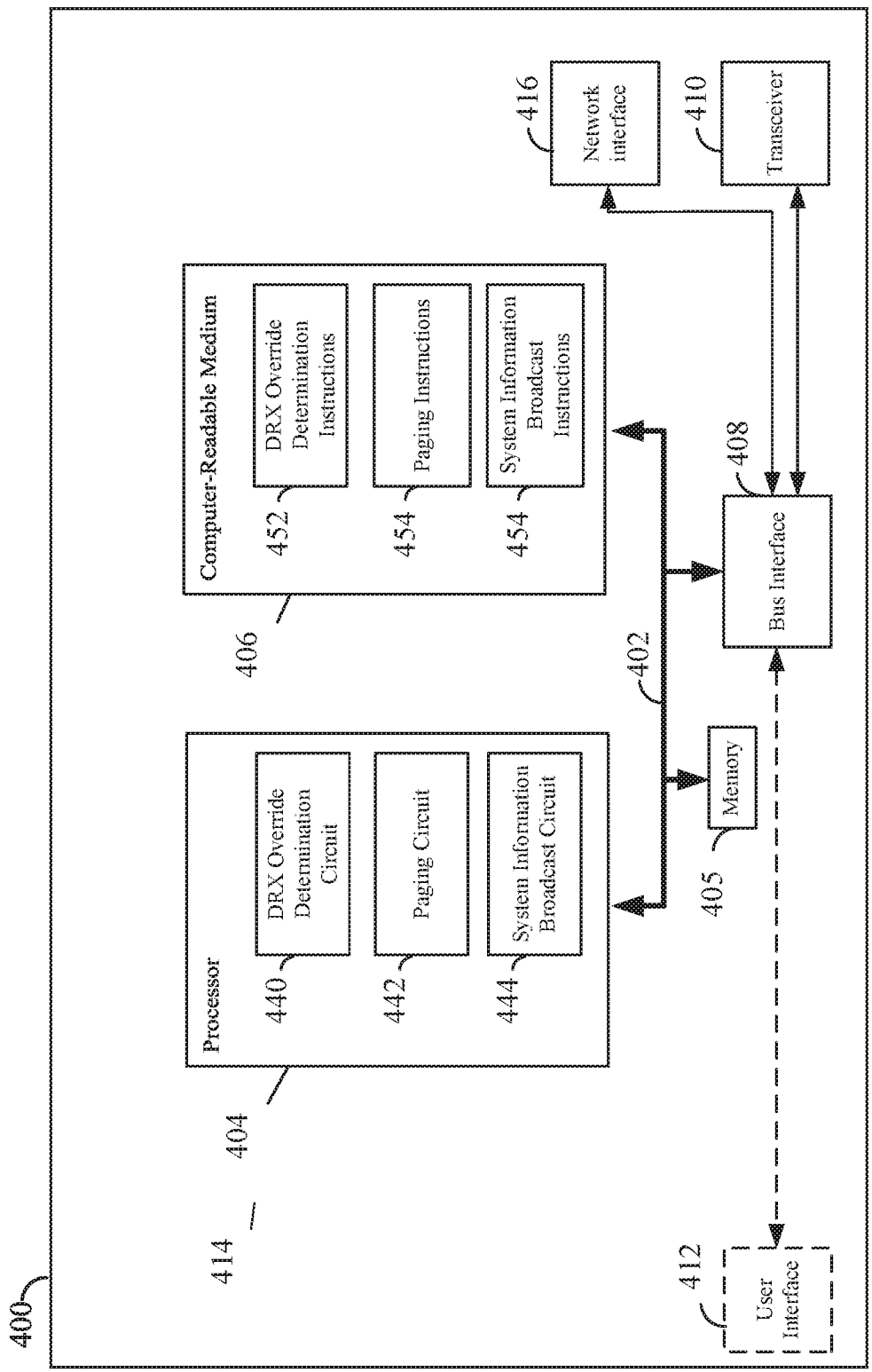
FIG. 4 is a block diagram conceptually illustrating an example of a hardware implementation for a scheduling entity in accordance with some aspects of the disclosed subject matter.

FIG. 4 is a block diagram conceptually illustrating an example of a hardware implementation for a scheduling entity 400 in accordance with some aspects of the disclosed subject matter, and is described as an illustrative example without limitation. For example, scheduling entity 400 can be a base station as illustrated in any one or more of FIGS. 1 and/or 2. In another example, scheduling entity 400 can be a user equipment as illustrated in any one or more of FIGS. 1 and/or 2.

In some aspects, scheduling entity 400 can be implemented with a processing system 414 that includes one or more processors 404. Examples of processors 404 include central processing units (CPUs), microprocessors, microcontrollers, digital signal processors (DSPs), field programmable gate arrays (FPGAs), programmable logic devices (PLDs), graphics processing units (GPUs), state machines, gated logic, discrete hardware circuits, and other suitable hardware configured to perform the various functionality described throughout this disclosure. In various examples, scheduling entity 400 can be configured to perform any one or more of the functions described herein. That is, processor 404, as utilized in scheduling entity 400, can be used to implement any one or more of the processes and procedures described below in connection with FIGS. 7-10.

In this example, processing system 414 can be implemented with a bus architecture, represented generally by the bus 402. Bus 402 can include any number of interconnecting buses and bridges depending on the specific application of processing system 414 and the overall design constraints. Bus 402 can communicatively couple together various circuits including one or more processors (represented generally by processor 404), memory 405, and computer-readable media (represented generally by computer-readable medium 406). Bus 402 can also link various other circuits such as timing sources, peripherals, voltage regulators, and power management circuits, which are well known in the art, and therefore, will not be described any further. A bus interface 408 can provide an interface between bus 402 and a transceiver 410. Transceiver 410 can provide a wireless communication interface or means for communicating with various other apparatus over a transmission medium. Additionally, in some aspects, bus interface 408 can provide an interface between bus 402 and a network interface 416. Network interface 416 can provide a wired communication interface or means for communicating with various other apparatus over a transmission medium. For example, network interface 416 can be used to establish an N2 interface that can be used to communicate with one or more portions of a core network (e.g., for communication with an access and mobility management function node (AMF)). Depending upon the nature of the apparatus, a user interface 412 (e.g., keypad, display, speaker, microphone, joystick) can also be provided. Of course, such a user interface 412 can be omitted in some examples, such as a base station.

In some aspects of the disclosed subject matter, processor 404 can include discontinuous reception (DRX) override determination circuitry 440 configured for various functions, including, for example, determining whether DRX override is authorized for a particular UE and/or determining a DRX cycle to use for a particular UE. For example, DRX override determination circuitry 440 can be configured to implement one or more of the functions described below in connection with FIG. 9, such as functions described in connection with 906 to 912. Additionally, in some aspects, processor 404 can include paging circuitry 442 configured for various functions, including, for example, transmitting a paging message intended for a particular UE. For example, paging circuitry 442 can be configured to implement one or more of the functions described below in connection with FIG. 9, such as functions described in 910 and 912. Additionally, in some aspects, processor 404 can include system information broadcast circuitry 444 configured for various functions, including, for example, broadcasting system information blocks (SIB) that can include, among other things, information related to the default paging cycle of the serving cell and an indication of whether default DRX override is supported. For example, system information broadcasting circuitry 444 can be configured to implement one or more of the functions described below in connection with FIG. 9, such as functions described in 902.

Processor 404 can manage bus 402 and can perform general processing, including the execution of software stored on computer-readable medium 406, which, when executed by processor 404, causes processing system 414 to perform the various functions described below (e.g., in connection with FIGS. 7-10) for any particular apparatus. In some aspects, computer-readable medium 406 and memory 405 can also be used for storing data that is manipulated by processor 404 when executing software.

In one or more examples, computer-readable storage medium 406 can include discontinuous reception (DRX) override determination software 452 configured for various functions, including, for example, determining whether DRX override is authorized for a particular UE and/or determining a DRX cycle to use for a particular UE. For example, DRX override determination software 452 can be configured to implement one or more of the functions described below in connection with FIG. 9, such as functions described in connection with 906 to 912. Additionally, in some aspects, computer-readable storage medium 406 can include paging software 454 configured for various functions, including, for example, transmitting a paging message intended for a particular UE. For example, paging software 454 can be configured to implement one or more of the functions described below in connection with FIG. 9, such as functions described in 910 and 912. Additionally, in some aspects, computer-readable storage medium 406 can include system information broadcast software 456 configured for various functions, including, for example, broadcasting system information blocks (SIB) that can include, among other things, information related to the default paging cycle of the serving cell and an indication of whether default DRX override is supported. For example, system information broadcasting software 456 can be configured to implement one or more of the functions described below in connection with FIG. 9, such as functions described in 902.

One or more processors 404 in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software can reside on a computer-readable medium 406. The computer-readable medium 406 can be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that can be accessed and read by a computer. The computer-readable medium 406 can reside in the processing system 414, external to the processing system 414, or distributed across multiple entities including the processing system 414. The computer-readable medium 406 can be embodied in a computer program product. By way of example, a computer program product can include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 406 can include DL scheduling software 1052 configured for various functions, including, for example, scheduling the start time of downlink transmissions to a scheduled entity (e.g., a UE) with various slots, and the length of time of the data transmission (e.g., using SLIV). For example, DL scheduling software 1052 can be configured to implement one or more of the functions described above in relation to FIG. 9, such as functions described in connection with 908 and/or 912. Additionally, in some aspects, computer-readable storage medium 1006 can include DI calculation software 1054 configured for various functions, including, for example, determining a length of time, in symbols, of an additional DL interruption needed by a particular UE to perform an uplink transmit switching on a given band associated with scheduling entity 1000. For example, DI calculation software 1054 can be configured to implement one or more of the functions described above in connection with FIG. 9, such as functions described in connection with 912.

Figure 5:
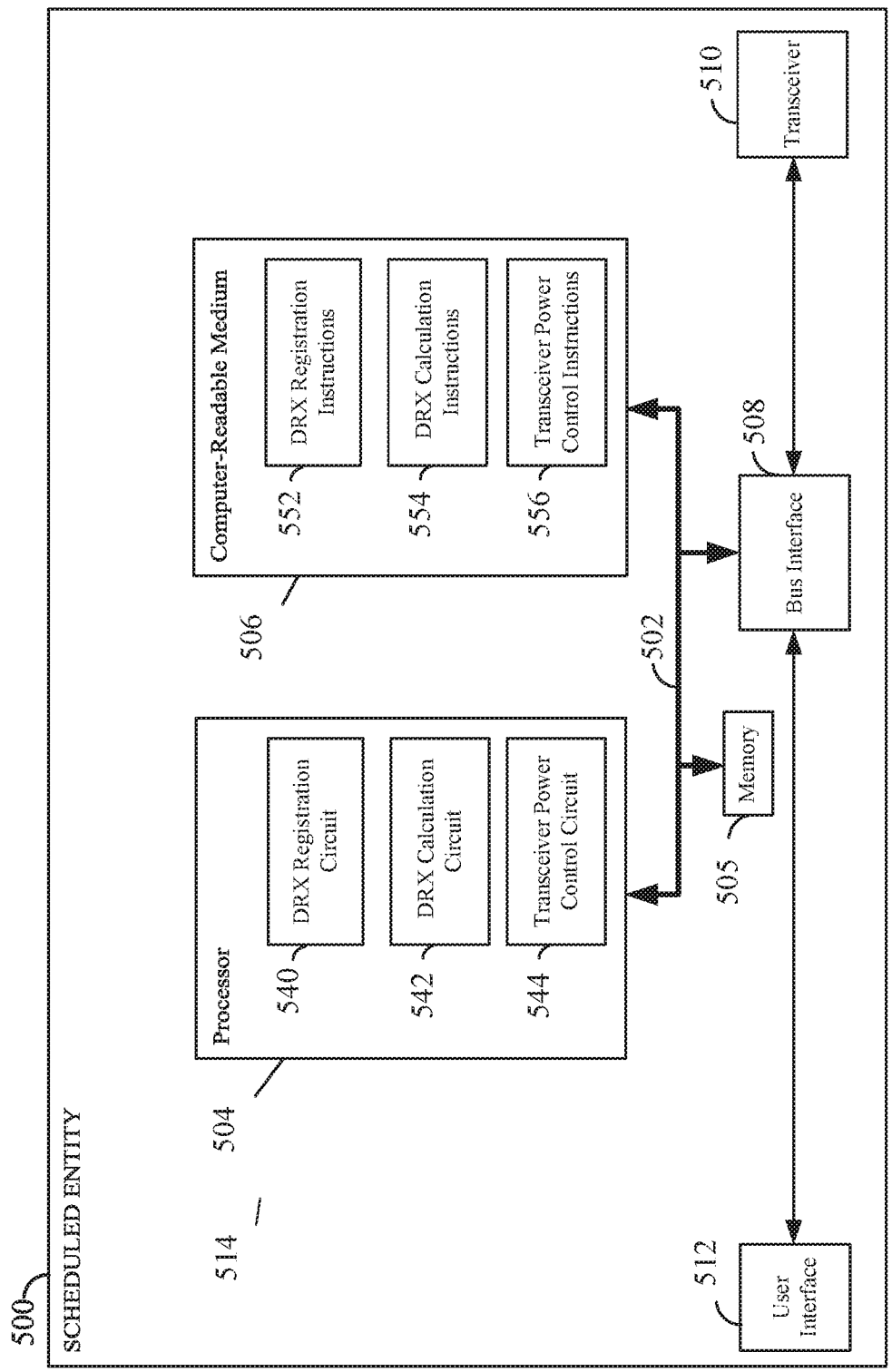
FIG. 5 is a block diagram conceptually illustrating an example of a hardware implementation for a scheduled in accordance with some aspects of the disclosed subject matter.

FIG. 5 is a block diagram conceptually illustrating an example of a hardware implementation for a scheduled entity 500 in accordance with some aspects of the disclosed subject matter, and is described as an illustrative example without limitation. For example, scheduled entity 500 can be a user equipment (UE) as illustrated in any one or more of FIGS. 1 and/or 2. In accordance with some aspects of the disclosure, an element, or any portion of an element, or any combination of elements can be implemented with a processing system 514 that includes one or more processors 504.

In some aspects, processing system 514 can be substantially the same as the processing system 414 illustrated in FIG. 4, including a bus interface 508, a bus 502, memory 505, processor 504, and a computer-readable medium 506. Furthermore, scheduled entity 500 can include a user interface 512 and a transceiver 510 substantially similar to those described above in FIG. 4. That is, processor 504, as utilized in a scheduled entity 500, can be used to implement any one or more of the processes described below in connection with FIGS. 7-10.

In some aspects of the disclosure, processor 504 can include DRX registration circuitry 540 configured for various functions, including, for example, requesting a DRX cycle from an AMF and determining a DRX cycle assigned to the UE by the AMF. For example, DRX registration circuitry 540 can be configured to implement one or more of the functions described below in connection with FIG. 8, such as functions described in connection with 804 and/or 806. Additionally, in some aspects, processor 504 can include DRX calculation circuitry 542 configured for various functions, including, for example, determining a DRX cycle to use with a particular base station. For example, DRX calculation circuitry 542 can be configured to implement one or more of the functions described below in connection with FIG. 8, such as functions described in connection with 808 to 814. Additionally, in some aspects, processor 504 can include transceiver power control circuitry 544 configured for various functions, including, for example, controlling a power state of transceiver 510 between at least a low power state (e.g., an OFF state) and a higher power state (e.g., an ON state). For example, transceiver power control circuitry 544 can be configured to implement one or more of the functions described below in connection with FIG. 8, such as functions described in connection with 816. In a more particular example, transceiver power control circuitry 544 can be configured to control an operational state of transceiver 510 when the UE is in an RRC_INACTIVE or RRC_IDLE state.

In one or more examples, computer-readable storage medium 506 can include DRX registration software 552 configured for various functions, including, for example, requesting a DRX cycle from an AMF. For example, DRX registration software 552 can be configured to implement one or more of the functions described below in relation to FIG. 8, such as functions described in connection with 804 and/or 806. Additionally, in some aspects, computer-readable storage medium 506 can include DRX calculation circuitry 554 configured for various functions, including, for example, determining a DRX cycle to use with a particular base station. For example, DRX calculation circuitry 554 can be configured to implement one or more of the functions described below in connection with FIG. 8, such as functions described in connection with 808 to 816. Additionally, in some aspects, computer-readable storage medium 506 can include transceiver power control software 556 configured for various functions, including, for example, controlling a power state of transceiver 510 between at least a low power state (e.g., an OFF state) and a higher power state (e.g., an ON state). For example, transceiver power control software 556 can be configured to implement one or more of the functions described below in connection with FIG. 8, such as functions described in connection with 816. In a more particular example, transceiver power control software 556 can be configured to control an operational state of transceiver 510 when the UE is in an RRC_INACTIVE or RRC_IDLE state.

Figure 6:
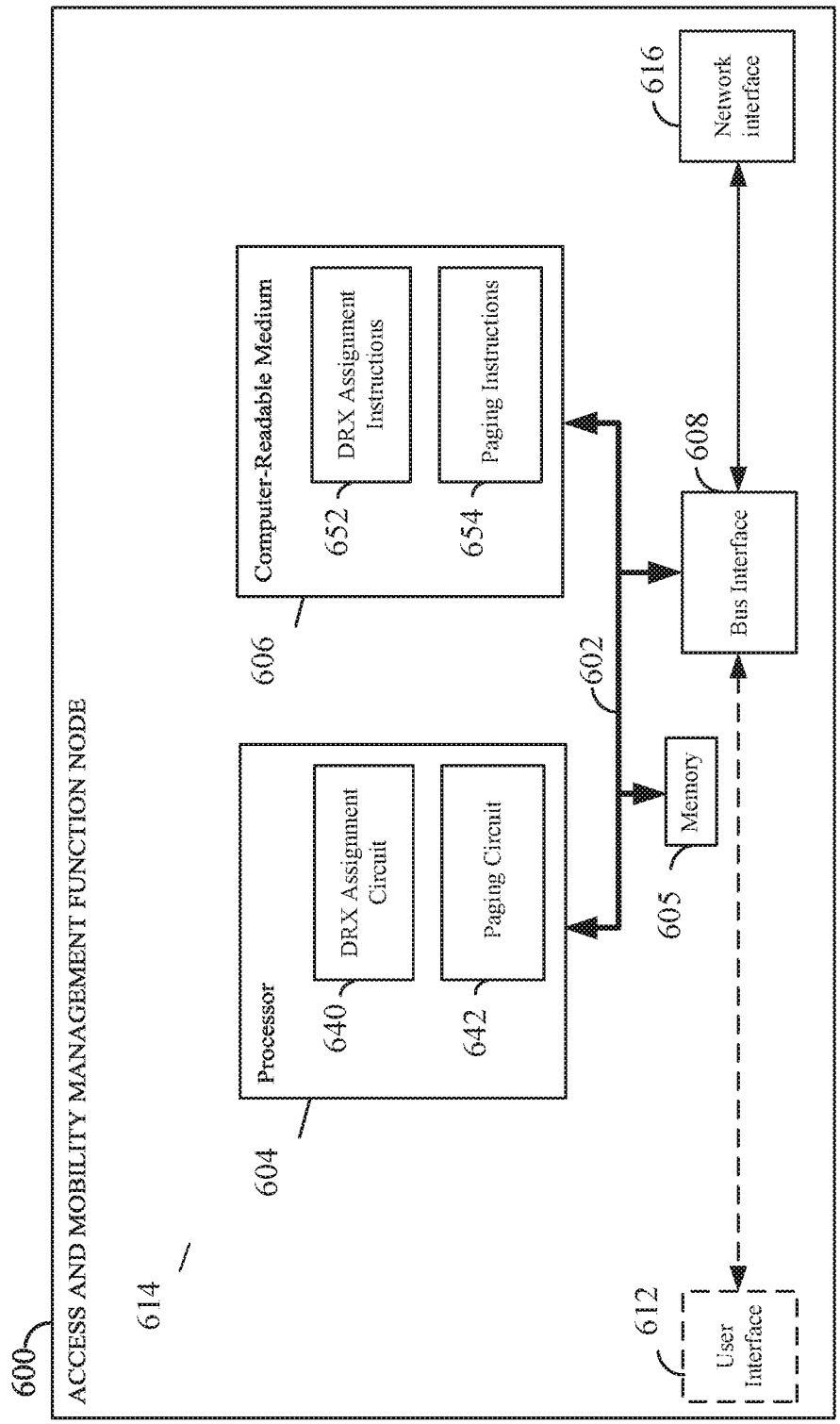
FIG. 6 is a block diagram conceptually illustrating an example of a hardware implementation for an access and mobility management function node in accordance with some aspects of the disclosed subject matter.

FIG. 6 is a block diagram conceptually illustrating an example of a hardware implementation for an access and mobility management function node (AMF) 600 in accordance with some aspects of the disclosed subject matter, and is described as an illustrative example without limitation. For example, AMF 600 can be component of core network illustrated in FIG. 1. In accordance with some aspects of the disclosure, an element, or any portion of an element, or any combination of elements can be implemented with a processing system 614 that includes one or more processors 604.

In some aspects, processing system 614 can be substantially the same as the processing system 414 illustrated in FIG. 4, including a bus interface 608, a bus 602, memory 605, processor 604, and a computer-readable medium 606. Furthermore, scheduled entity 600 can include a user interface 612 and a network interface 616 substantially similar to those described above in FIG. 4. That is, processor 604, as utilized in an AMF 600, can be used to implement any one or more of the processes described below in connection with FIGS. 7-10. For example, network interface 616 can be used to establish an N2 interface that can be used to communicate with one or more portions of a RAN (e.g., for communication with a base station, such as base station 108, base station 210, etc.).

In some aspects of the disclosure, processor 604 can include DRX assignment circuitry 640 configured for various functions, including, for example, assigning a DRX cycle for a UE to us in an inactive state or an idle state, and determining whether to allow the UE to override a base station default paging cycle. For example, DRX assignment circuitry 640 can be configured to implement one or more of the functions described below in connection with FIG. 10, such as functions described in connection with 1002 to 1010. Additionally, in some aspects, processor 604 can include paging circuitry 642 configured for various functions, including, for example, transmitting paging messages to a base station when new data requiring paging of a UE is received, including a DRX cycle for the UE and an indication of whether the UE is authorized to override the default base station paging cycle. For example, paging circuitry 642 can be configured to implement one or more of the functions described below in connection with FIG. 10, such as functions described in connection with 1016 to 1020.

In one or more examples, computer-readable storage medium 606 can include DRX assignment software 652 configured for various functions, including, for example, assigning a DRX cycle for a UE to us in an inactive state or an idle state, and determining whether to allow the UE to override a base station default paging cycle. For example, DRX assignment software 652 can be configured to implement one or more of the functions described below in relation to FIG. 10, such as functions described in connection with 1002 to 1010. Additionally, in some aspects, computer-readable storage medium 606 can include paging software 654 configured for various functions, including, for example, transmitting paging messages to a base station when new data requiring paging of a UE is received, including a DRX cycle for the UE and an indication of whether the UE is authorized to override the default base station paging cycle. For example, paging software 652 can be configured to implement one or more of the functions described below in connection with FIG. 10, such as functions described in connection with 1016 to 1020.

Figure 7:
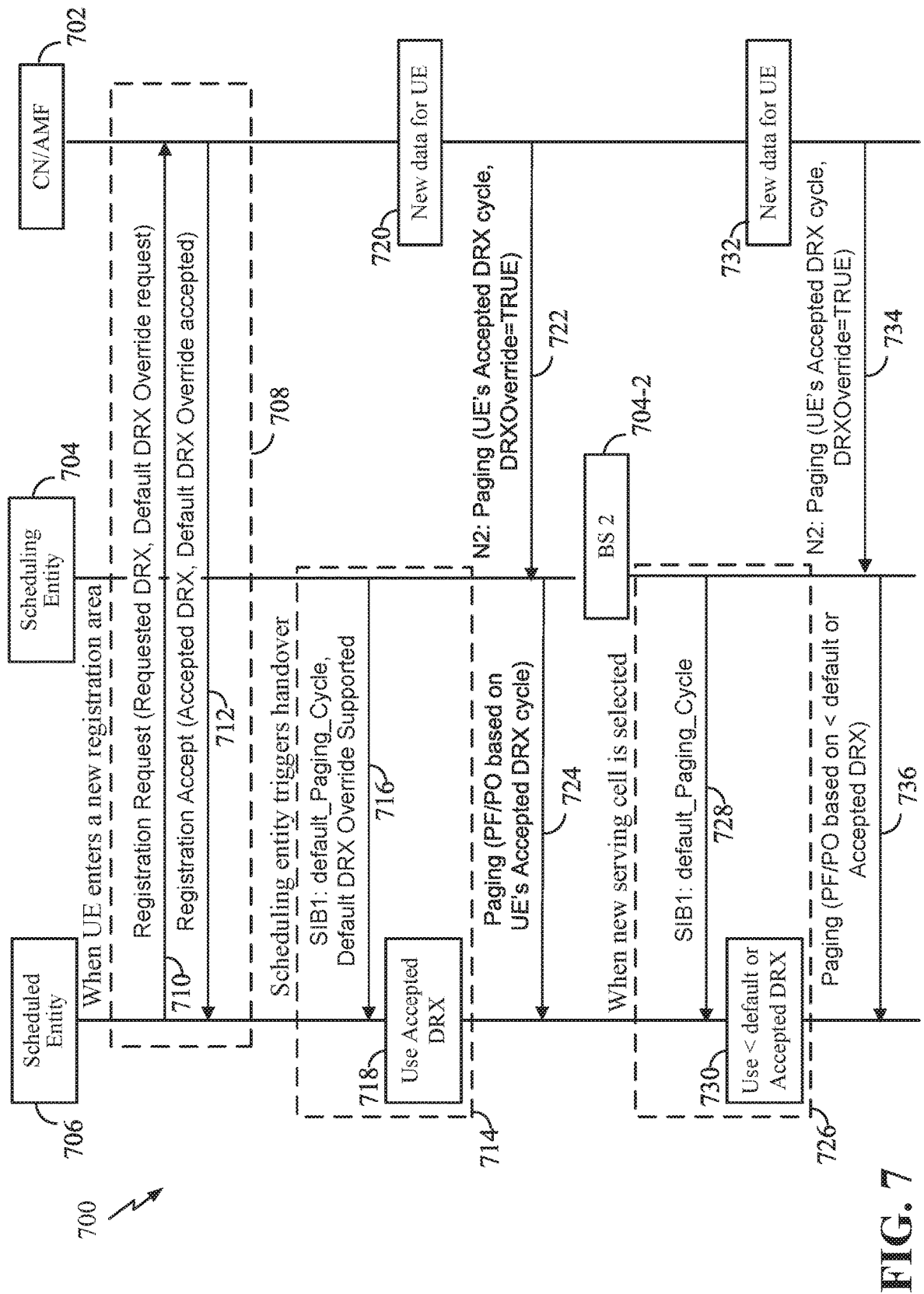
FIG. 7 is a signaling diagram illustrating exemplary signaling between a core network, scheduling entity, and a scheduled entity within a wireless communication system to schedule a discontinuous reception cycle for the scheduled entity in accordance with some aspects of the disclosed subject matter.

FIG. 7 is a signaling diagram illustrating exemplary signaling between a core network 702, a scheduling entity 704, and a scheduled entity 706 within a wireless communication system 700 to schedule a discontinuous reception (DRX) cycle for the scheduled entity in accordance with some aspects of the disclosed subject matter, and is described as an illustrative example without limitation. In some aspects, wireless communication system 700 can correspond, for example, to a portion of wireless communication system 100 described above in connection with, and shown in, FIG. 1. In some aspects, core network (CN) 702 can correspond, for example, to a core network 102, an AMF, and/or any other suitable components of a core network. In some aspects, scheduling entity 704 can correspond, for example, to a base station (e.g., a gNB or eNB) or other scheduling entity described above in connection with FIGS. 1 and/or 2. In some aspects, scheduled entity 706 can correspond, for example, to a UE or other scheduled node as described above in connection with FIGS. 1 and/or 2.

At 708, when scheduled entity 706 enters a new registration area, scheduled entity 706 can carry out a registration process. In some aspects, registration process 708 can involve scheduled entity 706 transmitting, at 710, a Registration Request message to CN 702. In some aspects, the Registration Request message can include any suitable information that CN 702 can use to determine whether to accept registration of scheduled entity 706. Additionally, in some aspects, scheduled entity 706 can include a requested discontinuous reception (DRX) cycle in the Registration Request message, and/or can include a request to override a default DRX cycle of a scheduling entity (e.g., scheduling entity 704), which can sometimes be referred to as a Default DRX Override request. In some aspects, the requested DRX cycle and/or Default DRX Override request can be formatted in any suitable format. For example, the requested DRX cycle can be formatted as an integer representing a time interval (e.g., in milliseconds, frames, sub-frames, slots, symbols, etc.), or a decimal number representing a time interval (e.g., in seconds). As another example, the requested DRX cycle can be formatted as an integer representing a multiplier used to determine the DRX cycle by multiplying a base value by the multiplier. As yet another example, the Default DRX Override request can be formatted as a binary flag (e.g., a 0 indicating no request for Default DRX Override is being submitted, and a 1 indicating that a Default DRX Override request is being submitted). As still another example, the Default DRX Override request can be inferred based on the duration of the requested DRX cycle (e.g., a DRX over a threshold corresponding to a default RAN paging cycle can infer a request for Default DRX Override is being submitted).

In some aspects, registration process 708 can involve CN 702 transmitting, at 712, a Registration Accept message to scheduled entity 706. In some aspects, the Registration Accept message can include an accepted DRX cycle that has been assigned to scheduled entity 706, and an indication of whether a Default DRX Override request was accepted. In some aspects, the accepted DRX cycle can be the same as the requested DRX cycle, or can be different than the requested DRX cycle (e.g., either longer or shorter). For example, in some aspects, if a Default DRX Override request was not accepted, CN 702 can assign a DRX cycle as the accepted DRX cycle that is no longer in duration than a default paging cycle. As another example, in some aspects, CN 702 can assign a somewhat longer or shorter DRX cycle than the requested DRX cycle for various reasons, such as availability of a time slot corresponding to the requested DRX cycle, based on subscription of the scheduled entity, local configuration, latency requirements for a public warning system, etc. In some aspects, the accepted DRX cycle and/or Default DRX Override request can be formatted in any suitable format. For example, the accepted DRX cycle can be formatted as an integer representing a time interval (e.g., in milliseconds, frames, sub-frames, slots, symbols, etc.), or a decimal number representing a time interval (e.g., in seconds). As yet another example, the Default DRX Override acceptance can be formatted as a binary flag (e.g., a 0 indicating the request for Default DRX Override was not accepted, and a 1 indicating that the Default DRX Override request was accepted). As still another example, acceptance of the Default DRX Override request can be inferred based on the duration of the accepted DRX cycle (e.g., a DRX over a threshold corresponding to a default RAN paging cycle can infer acceptance of a request for Default DRX Override).

At 714, a scheduling entity (e.g., scheduling 704 or another scheduling entity) triggers a handover and selects a new serving cell (e.g., associated with scheduling entity 704) for scheduled entity 706, scheduled entity 706 can determine whether to use the accepted DRX cycle received from CN 702 or the default paging cycle associated with the selected serving cell. Note that this is merely an example, and other components of the network can select a cell for scheduled entity 706 and/or can trigger connection to a new cell. For example, a scheduled entity 706 in RRC_IDLE state can select a cell.

At 716, scheduling entity 704 can transmit a system information block (SIB) that includes information related to the default paging cycle of the serving cell and an indication of whether default DRX override is supported. In some aspects, scheduling entity 704 can transmit a default_Paging_Cycle value (e.g., as an integer, as a floating point number, etc.), and a Default DRX Override Supported value (e.g., as a binary with 0 corresponding to false and 1 corresponding to true). In some aspects, the SIB can be a SIB1.

In some aspects, scheduling entity 704 can broadcast a maximum DRX cycle that is supported by the scheduling entity 704. For example, scheduling entity 704 can use a system information modification period to inform scheduled entities that at least a portion of the system information is being modified. In such an example, if scheduling entity 704 is modifying its system information (e.g., the information included in SIB1), scheduling entity 704 can provide a notification that the system information is going to change (e.g., via downlink control information (DCI), such as a Short Message included in DCI transmitted on the physical downlink control channel (PDCCH)) in a system information modification period preceding the change to the system information. When the system information modification period during which the notification was transmitted has elapsed, scheduling entity 704 can begin including the modified system information in one or more system information blocks (e.g., SIB1). In some aspects, scheduling entity 704 can broadcast a maximum DRX cycle that scheduling entity 704 supports, which can be shorter than or equal to the system information modification period. Thus, UEs served by scheduling entity 704 wake at least once during each system information modification period. In some aspects, scheduling entity 704 can provide information indicative of the boundaries of the system information modification period in the system information (e.g., in SIB1). In some aspects, information indicative of the boundaries of the system information modification period can define the length of the system information modification period in radio frames.

In some aspects, scheduling entity 704 can broadcast the maximum DRX cycle in addition to, or in lieu of, a Default DRX Override Supported value. For example, scheduling entity 704 can broadcast the maximum DRX cycle in addition to, or in lieu of, a Default DRX Override Supported value. In a more particular example, scheduling entity 704 can broadcast the maximum DRX cycle supported if it supports default DRX override. In such an example, if a UE received a SIB (e.g., a SIB1) that includes a maximum DRX cycle value, the UE can determine that default DRX override is supported. Otherwise, if a UE received a SIB (e.g., a SIB1) that does not include a maximum DRX cycle value, the UE can determine that default DRX override is not supported. Alternatively, omission of a maximum DRX cycle may not indicate default DRX override is not supported. For example, in some aspects, scheduling entity 704 and/or UEs served by scheduling entity 704 can infer a maximum DRX cycle supported by the scheduling entity 704 based on other system information broadcast by scheduling entity 704. In such an example, scheduling entity 704 and/or UEs served by scheduling entity 704 can use the system information modification period duration to determine a maximum DRX cycle supported by scheduling entity 704.

At 718, scheduled entity 706 can use the accepted DRX cycle that was received in the Registration Accept message from CN 702 based on the SIB received from scheduling entity 704 indicating that default DRX override is supported.

In some aspects, CN 702 can receive and/or generate new data 720 that needs to be communicated to scheduled entity 706, and at 722, CN 702 can notify scheduling entity 704 of new data 720 (e.g., using an N2 paging message). In some aspects, CN 702 can include information related to the DRX cycle assigned to scheduled entity 706 with new data 720 (e.g., by including the DRX cycle in the paging message). Additionally, in some aspects, CN 702 can include an indication that default DRX override is approved for the scheduled entity associated with new data 720.

At 724, scheduling entity 704 can transmit a paging message for scheduled entity 706 at a paging frame and paging occasion that is based on the accepted DRX cycle in response to the paging message received from CN 702.

At 726, a scheduling entity (e.g., scheduling 704 or another scheduling entity) triggers a handover and selects a new serving cell (e.g., associated with a second scheduling entity 704-2) scheduled entity 706 (e.g., due to a handover decision), scheduled entity 706 can determine whether to use the accepted DRX cycle received from CN 702 or the default paging cycle associated with the selected serving cell. As described above in connection with 714, this is merely an example, and other components of the network can select a cell for scheduled entity 706 and/or can trigger connection to a new cell. For example, a scheduled entity 706 in RRC_IDLE state can select a cell.

At 728, scheduling entity 704-2 can transmit a SIB (e.g., a SIB1) that includes information related to the default paging cycle of the serving cell and an indication that default DRX override is not supported. In some aspects, scheduling entity 704-2 can transmit a default_Paging_Cycle value (e.g., as an integer, as a floating point number, etc.), and can either transmit a Default DRX Override Supported value (e.g., as a binary with 0 corresponding to false) or can omit a Default DRX Override Supported value indicating that default DRX override is not supported. Alternatively, as described above in connection with 716, omission of a maximum DRX cycle value in the SIB broadcast by scheduling entity 704-2 can indicate that default DRX override is not supported.

At 730, scheduled entity 706 can use the shorter of the accepted DRX cycle that was received in the Registration Accept from CN 702 and the default paging cycle based on the SIB received from scheduling entity 704-2 indicating that default DRX override is not supported.

In some aspects, CN 702 can receive and/or generate new data 732 for scheduled entity 706, and at 734, CN 702 can notify scheduling entity 704-2 of new data 732 (e.g., using an N2 paging message). In some aspects, CN 702 can include information related to the DRX cycle assigned to scheduled entity 706 with new data 732 (e.g., by including the DRX cycle in the paging message). Additionally, in some aspects, CN 702 can include an indication that default DRX override is approved for the scheduled entity associated with new data 732.

At 736, scheduling entity 704-2 can transmit a paging message for scheduled entity 706 at a paging frame and paging occasion that is based on the shorter of the accepted DRX cycle that was received in the Registration Accept from CN 702 and the default paging cycle.

Figure 8:
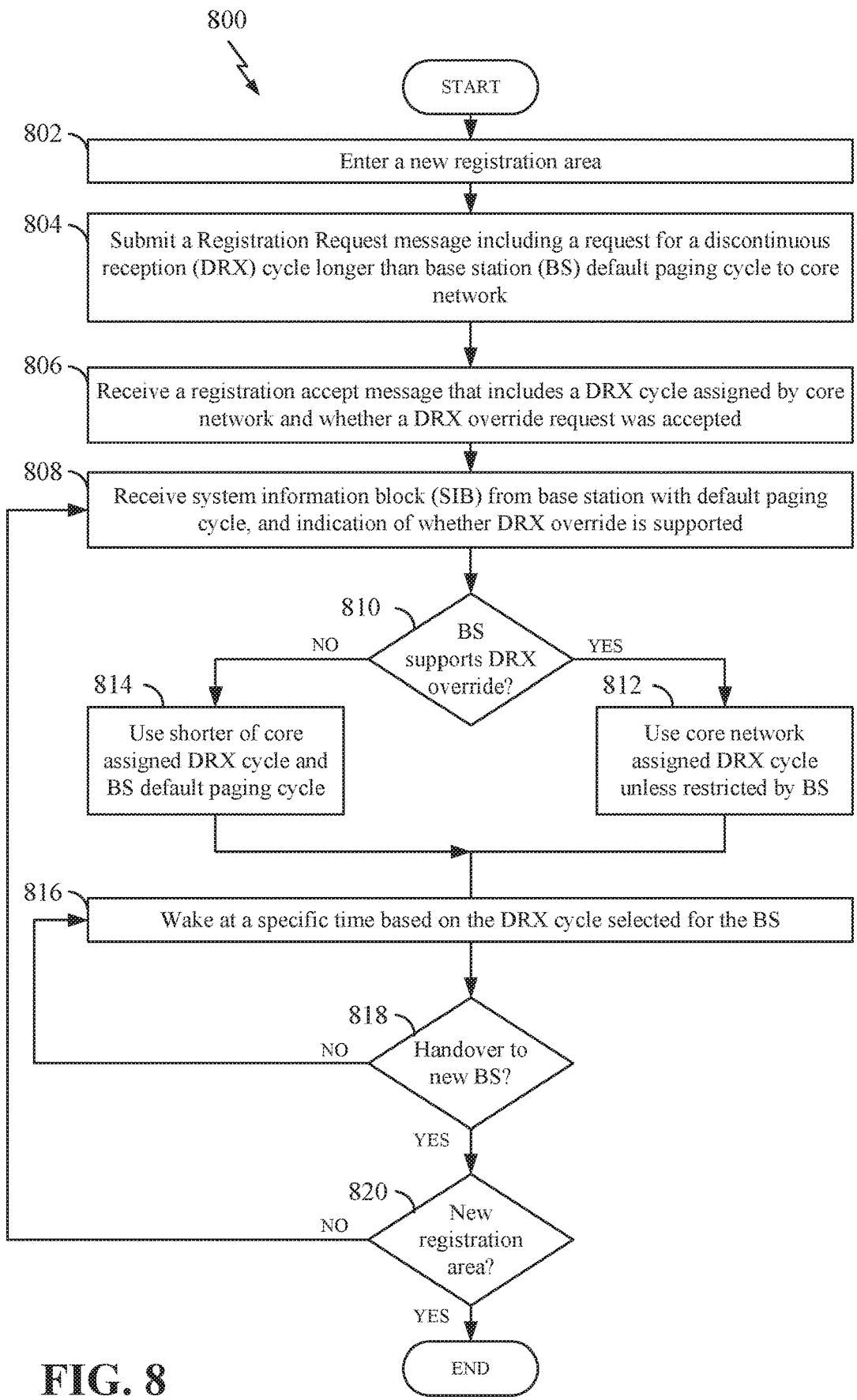
FIG. 8 is a flow chart illustrating an exemplary process for a scheduled entity to determine a discontinuous reception cycle to utilize with scheduling entities in a registration area in accordance with some aspects of the disclosed subject matter.

FIG. 8 is a flow chart illustrating an exemplary process 800 for a scheduled entity to determine a discontinuous reception cycle to utilize with scheduling entities in a registration area in accordance with some aspects of the disclosed subject matter, and is described as an illustrative example without limitation. As described below, some or all illustrated features can be omitted in a particular implementation within the scope of the disclosed subject matter, and some illustrated features may not be required for implementation of all embodiments. In some examples, process 800 can be carried out (e.g., executed) by user equipment described above in connection with FIG. 5, and/or UE 106 described above in connection with FIG. 1. In some examples, process 800 can be carried out by any suitable apparatus or means for carrying out the functions or algorithm described below.

At 802, a UE can enter a new registration area in which it is necessary for the UE to register with the core network. In some aspects, the UE can enter a new registration area for various reasons, such as when moving between coverage areas of different base stations, or when transitioning from a state in which connections are inhibited (e.g., a power off state, a state in which a transmitter is powered down). Registration areas can be defined by the network, and may generally correspond to contiguous geographic areas, such as a large metropolitan area, a county, etc. In some aspects, the UE can determine that it has entered a new registration area using any suitable technique or combination of techniques. For example, the UE can receive a message that includes information indicating that a scheduling entity (e.g., base station 108, base station 210) is within a particular registration area. In a more particular example, the UE can receive a message explicitly indicating that it has entered a new registration area.

At 804, a UE can submit a registration request message (which can be a Registration Request message defined according to one or more 5G standards, such as 3GPP Technical Specification 23.501) that includes a request for a discontinuous reception (DRX) cycle that is longer than the default base station (BS) paging cycle to the core network (e.g., to an AMF). Additionally, in some aspects, the registration request message can include an explicit request to override the default DRX of the base stations. For example, as described above in connection with 710 of FIG. 7, the UE can transmit a Registration Request message that includes a requested DRX cycle (in any suitable format), and in some aspects, a Default DRX Override request, to an AMF. In some aspects, the UE can transmit such a request using the N1 interface, which can be communicated via a base station. In some aspects, the UE can transmit the Registration Request message using a transceiver (e.g., transceiver 510) to transmit the request via any suitable communication network (e.g., via a RAN, such as RAN 104 or RAN 200, using one or more UL slots, etc.) and/or any suitable channel (e.g., via a channel that carries RRC messages). In some aspects, the UE can transmit the Registration Request message using any suitable communication interface, such as a transceiver (e.g., transceiver 510).

At 806, a UE can receive a registration accept message (which can be a Registration Accept message defined according to one or more 5G standards, such as 3GPP Technical Specification 23.501) that includes an accepted DRX cycle that is assigned to the UE by the core network (e.g., by the AMF). Additionally, in some aspects, the registration accept message can include an explicit indication that override of the default DRX of the base stations has been accepted. For example, as described above in connection with 712 of FIG. 7, the UE can receive a Registration Accept message that includes an accepted DRX cycle (in any suitable format), and in some aspects, a Default DRX Override accept (if such a request was accepted), from an AMF. In some aspects, such a message can be transmitted using the N1 interface, and can be communicated via a base station. In some aspects, the UE can receive the registration message by sampling and buffering a received wireless signal on a particular channel, and applying suitable processing to the buffered signal such as energy detection, demodulation, decoding, etc. In some aspects, the UE can receive the registration accept message using any suitable communication interface, such as a transceiver (e.g., transceiver 510).

In some aspects, the accepted DRX cycle can be the same as the requested DRX cycle, or different than the requested DRX cycle. For example, as described above in connection with 712 of FIG. 7 the accepted DRX can be longer or shorter than the accepted DRX, and may or may not exceed the default paging cycle used by many base stations. In some aspects, the accepted DRX cycle can exceed the default paging cycle for many base stations, but the AMF can indicate that the default DRX override request was denied. As described below, in such a situation, the UE can use the default paging cycle for most base stations, and can use the accepted DRX cycle for any base stations with unusually long default paging cycles.

At 808, a UE can receive a system information block (SIB) from a BS that includes a default paging cycle associated with that base station, and an indication of whether the base station supports a DRX override feature of the default paging cycle (e.g., to use an accepted DRX cycle assigned to the UE that is longer than the default paging cycle). In some aspects, the UE can receive the SIB by sampling and buffering a received wireless signal on a particular channel (e.g., via the physical downlink shared channel (PDSCH), downlink shared channel (DL-SCH), and/or the broadcast control channel (BCCH)) applying suitable processing to the buffered signal such as energy detection, demodulation, decoding, etc. In some aspects, the UE can receive the registration accept message using any suitable communication interface, such as a transceiver (e.g., transceiver 510).

In some aspects, the presence of a particular Default DRX Override Supported value (e.g., a binary 1) in the SIB can be an indication that the base station supports a DRX override feature of the default paging cycle. Additionally or alternatively, the presence of a (non-zero) maximum DRX cycle value in the SIB can be an indication that the base station supports a DRX override feature of the default paging cycle. Similarly, in some aspects, the presence of a particular Default DRX Override Supported value (e.g., a binary 0) in the SIB and/or the presence of a maximum DRX cycle value of zero in the SIB can be an indication that the base station does not support a DRX override feature of the default paging cycle. Alternatively, in some aspects, the absence of a Default DRX Override Supported value and the absence of any maximum DRX cycle value in the SIB can be an indication that the base station does not support a DRX override feature of the default paging cycle.

In some aspects, the UE can determine whether the BS supports DRX override using any suitable technique or combination of techniques. For example, the UE can determine whether the BS supports DRX override based on whether the SIB received at 808 includes an indication that the base station supports the DRX override feature. In a more particular example, the UE can determine whether a bit in the SIB used to indicate support or non-support of the DRX override feature is present or absent in the SIB, and if present, whether the bit is true (e.g., a binary 1) or false (e.g., a binary 0). As described above, in such an example, if the bit in the SIB used to indicate support or non-support of the DRX override feature is present and true, the UE can determine that base station supports the DRX override feature. Otherwise, if the bit is not present, or if the bit is present and is false, the UE can determine that base station does not support the DRX override feature.

As another more particular example, the UE the UE can determine whether the BS supports DRX override based on whether a field in the SIB used to indicate a maximum DRX cycle supported by the base station is present or absent. In such an example, if the field in the SIB used to indicate a maximum DRX cycle supported by the base station is present, the UE can determine that base station supports the DRX override feature. Otherwise, if the field in the SIB used to indicate a maximum DRX cycle supported by the base station is not present, or if the value is zero, the UE can determine that base station does not support the DRX override feature.

As yet another example, the UE the UE can determine whether the BS supports DRX override based on whether a field in the SIB used to indicate a maximum DRX cycle supported by the base station is present or absent, and if present, whether the value is non-zero. In such an example, if the field in the SIB used to indicate a maximum DRX cycle supported by the base station is present and non-zero, the UE can determine that base station supports the DRX override feature. Otherwise, if the field in the SIB used to indicate a maximum DRX cycle supported by the base station is not present, or if the value is zero, the UE can determine that base station does not support the DRX override feature.

At 810, if the UE determines that the BS supports DRX override ("YES" at 810), process 800 can move to 812. At 812, the UE can determine that the core network assigned DRX cycle (i.e., the accepted DRX included in the registration accept message received at 806) is to be used to determine paging intervals (e.g., to determine a paging frame and/or paging occasion for the UE) while the UE is connected to the BS, unless the length of the DRX cycle is restricted by the base station to a shorter duration.

In some aspects, the UE can determine whether the maximum DRX cycle supported by the base station is restricted to a duration that is shorter than the core network assigned DRX cycle, and if so, can use the maximum DRX cycle that is supported by the base station (e.g., in lieu of the core network assigned DRX cycle that is longer than the maximum DRX cycle supported by the base station). In some aspects, the UE can use any suitable information and/or any suitable technique to determine the maximum DRX cycle supported by the base station. For example, a SIB received from the base station can include an explicit indication of the maximum DRX cycle that is supported by that base station (e.g., in a maximum DRX cycle field). In such an example, the UE can compare the length of the maximum DRX cycle to the core network assigned DRX cycle to determine which is shorter, and can use the shorter of the two DRX cycle durations. As another example, a SIB received from the base station can include an indication of a length of the system information modification period associated with the base station, and may or may not omit an explicit indication of the maximum DRX cycle that is supported by that base station. In such an example, the UE can compare the length of the system information modification period to the core network assigned DRX cycle to determine which is shorter, and can use the shorter of the core network assigned DRX cycle and a value based on the system information modification period (e.g., a value that is not greater than the system information modification period).

Otherwise, if the UE determines that the BS does not support DRX override ("NO" at 810), process 800 can move to 814. At 814, the UE can determine that the shorter of the core network assigned DRX cycle and the default paging cycle is to be used to determine paging intervals (e.g., to determine a paging frame and/or paging occasion for the UE) while the UE is connected to the BS.

At 816, a UE can wake at a specific time (e.g., a specific paging frame and/or paging occasion) based on the paging interval selected at 812 or 814 to determine whether a paging message has been transmitted by the base station (or another base station in a RAN notification area (RNA) in which the UE is located). In some embodiments, the UE can use any suitable technique or combination of techniques to control power to the transceiver to transition between a low power state and a higher power state. For example, the UE can control a state of a switch that connects a power source (e.g., a battery) to the transceiver between a closed state in which power is available to the transceiver, and an open state in which power transfer to the transceiver is inhibited.

At 818, a UE can determine whether a handover to a new BS has been initiated. If the UE determines that handover to a new BS (e.g., a new service cell) has not been initiated ("NO" at 818), process 800 can return to 816. Otherwise, if the UE determines that handover to a new BS (e.g., a new service cell) has been initiated ("YES" at 818), process 800 can move to 820. Note that a handover can be initiated for any suitable reason, such as due to mobility of the UE between cells, due to load balancing by the network, etc. In some embodiments, the UE can determine that a handover has been initiated using any suitable technique or combination of techniques. For example, the UE can receive a message from the RAN including an indication that handover to a new BS has been initiated, and/or information that can be used to establish a connection with the new BS.

At 820, a UE can determine whether the UE has moved to a new registration area. If the UE has not moved to a new registration area ("NO" at 820), process 800 can return to 808 to receive a SIB from the new BS. Otherwise, if the UE determines that it has moved to a new registration area ("YES"), process 800 can end (e.g., a new instance of process 800 can start). In some aspects, the UE can be required transition to a connected state (sometimes referred to as RRC_CONNECTED) when entering a new registration area in order to transmit a registration request. Alternatively, in some aspects, in a compatible network, a registration request can be transmitted while in an inactive state. In some aspects, the UE can determine that it has entered a new registration area using any suitable technique or combination of techniques, such as techniques described above in connection with 802.

Figure 9:
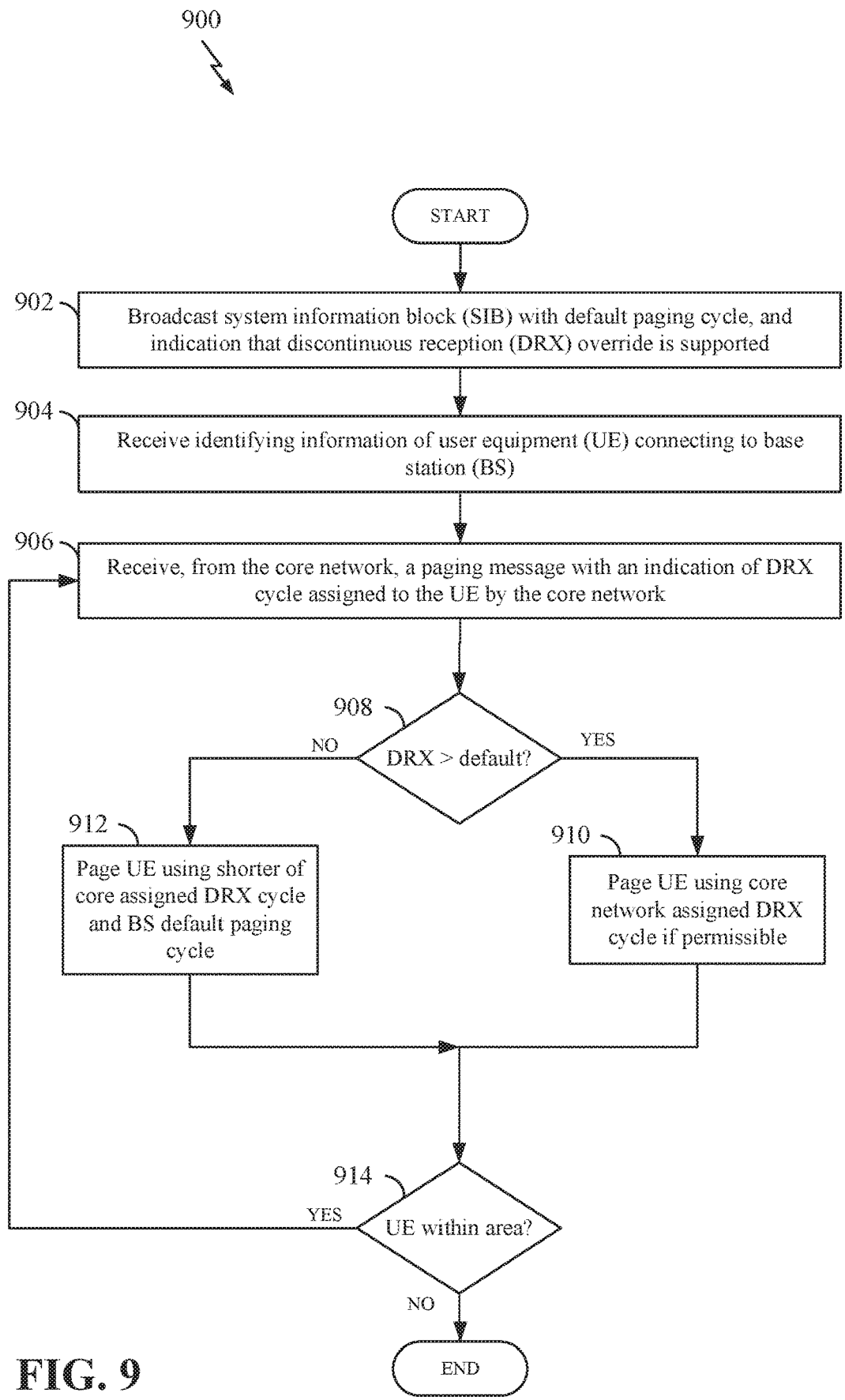
FIG. 9 is a flow chart illustrating an exemplary process for a scheduling entity to determine a discontinuous reception cycle to utilize for transmitting paging messages intended for a particular scheduled entity in accordance with some aspects of the disclosed subject matter.

FIG. 9 is a flow chart illustrating an exemplary process for a scheduling entity to determine a discontinuous reception cycle to utilize for transmitting paging messages intended for a particular scheduled entity in accordance with some aspects of the disclosed subject matter, and is described as an illustrative example without limitation. As described below, some or all illustrated features can be omitted in a particular implementation within the scope of the disclosed subject matter, and some illustrated features may not be required for implementation of all embodiments. In some examples, process 900 can be carried out (e.g., executed) by a base station described above in connection with FIG. 4, and/or base station 108 described above in connection with FIG. 1. In some examples, process 900 can be carried out by any suitable apparatus or means for carrying out the functions or algorithm described below.

At 902, a base station can broadcast a system information block (SIB) that includes information related to the default paging cycle of the serving cell and an indication of whether default DRX override is supported. In some aspects, the SIB can be a SIB1. Note that a legacy base station that does not support default DRX override may not include an indication that default DRX override is not supported (e.g., because the base station is not configured with such a capability). Alternatively, in some examples, a base station can support default DRX override during some periods and cannot support default DRX override during other periods (e.g., periods during which the base station is experiencing high utilization). In some aspects, the base station can use any suitable technique or combination of techniques to broadcast the SIB. For example, the base station can transmit the SIB using any suitable communication network (e.g., via a RAN, such as RAN 104 or RAN 200, using one or more DL slots, etc.). As another example, the base station can use any suitable communication channel or channels (e.g., the physical downlink shared channel (PDSCH), downlink shared channel (DL-SCH), and/or the broadcast control channel (BCCH)). In some aspects, the base station can receive the paging message using any suitable communication interface, such as a transceiver (e.g., transceiver 410).

At 904, a base station can receive identifying information of a user equipment (UE) connecting to the base station (e.g., when the base station is selected as a new service cell, as described above in connection with 714 of FIG. 7. In some aspects, the base station can receive the identifying information from any suitable source, such as the UE, an AMF (and/or another core network component) managing a handover from a previous base station, or an AMF (and/or another core network component sending a paging message intended for the UE). For example, the UE may not establish a connection with a base station prior to the base station receiving a paging message intended for the UE (e.g., as described below in connection with 906). In some aspects, the identifying information can be included in a context associated with the UE that is provided to the BS. In some aspects, the base station can receive the identifying information of the UE using any suitable communication interface, such as an N2 interface (e.g., via network interface 416), and/or a transceiver (e.g., transceiver 410).

At 906, a base station can receive, from the core network (e.g., from an AMF), a paging message including data for the UE, and an indication of the DRX cycle assigned to the UE as well as an indication of whether a default DRX override is approved for the UE. As described above in connection with 722 of FIG. 7, the DRX cycle and/or DRX override can be formatted in any suitable format. In some aspects, the base station can receive the paging message using any suitable communication interface, such as an N2 interface (e.g., via network interface 416), and/or a transceiver (e.g., transceiver 410).

At 908, a base station can determine whether the DRX cycle received at 906 is longer than the default paging cycle of the base station. In some aspects, the base station can also determine whether default DRX override is approved for the UE. If the base station determines that the DRX cycle for the UE is longer than the default paging cycle of the base station (and, in some aspects, that default DRX override has been explicitly authorized) ("YES" at 908), process 900 can move to 910. In some aspects, the base station can determine whether the DRX cycle received at 906 is longer than the default paging cycle using any suitable technique or combination of techniques. For example, the base station can compare the two values to determine if the DRX cycle received at 906 is longer than the default paging cycle.

At 910, a base station can use the DRX cycle assigned to the UE by the core network (i.e., the DRX cycle received in the paging message) to determine a timing (e.g., a paging frame and/or paging occasion) at which to transmit a paging message for the UE if the core network assigned DRX cycle is permissible. In some aspects, the base station can determine whether the core network assigned DRX cycle is permissible based on a maximum DRX cycle supported by the base station. If the core network assigned DRX cycle is longer than the maximum DRX cycle supported by the base station, the base station can use the maximum DRX cycle that is supported by the base station to page the UE (e.g., in lieu of the core network assigned DRX cycle that is longer than the maximum DRX cycle supported by the base station). In some aspects, the base station can use any suitable information and/or any suitable technique to determine the maximum DRX cycle supported by the base station. For example, the base station can include an explicit indication of the maximum DRX cycle supported by that base station in a SIB. In a particular example, the base station can calculate a maximum DRX cycle supported by that base station (e.g., based on the system information modification period associated with the base station), and can include a value based on the calculated maximum DRX cycle in the SIB. Additionally or alternatively, the base station can receive a value for the maximum DRX cycle supported by that base station from another node (e.g., from a core network component), and can include the received value in the SIB. In such examples, In such an example, the base station can compare the length of the maximum DRX cycle to the core network assigned DRX cycle to determine which is shorter, and can use the shorter of the two DRX cycle durations to page the UE.

As another example, the base station can include an indication of a length of the system information modification period associated with the base station in the SIB, and may or may not omit an explicit indication of the maximum DRX cycle that is supported by that base station. In such an example, the base station can compare the length of the system information modification period to the core network assigned DRX cycle to determine which is shorter, and can use the shorter of the core network assigned DRX cycle and a value based on the system information modification period (e.g., a value that is not greater than the system information modification period) to page the UE.

Otherwise, if the base station determines that the DRX cycle for the UE is less than or equal to the default paging cycle of the base station (or, in some aspects, that default DRX override has not been explicitly authorized) ("NO" at 908), process 900 can move to 912.

At 912, a base station can use the shorter of the core network assigned DRX cycle and the default paging cycle to determine a timing (e.g., a paging frame and/or paging occasion) at which to transmit a paging message for the UE. In some aspects, the base station can use any suitable technique or combination of techniques to transmit a paging message intended for the UE at 910 or 912. For example, the base station can transmit the paging message as an RRC SIB using any suitable communication network (e.g., via a RAN, such as RAN 104 or RAN 200, using one or more DL slots, etc.). As another example, the base station can use any suitable communication channel or channels (e.g., the physical downlink shared channel (PDSCH), the paging channel (PCH), and/or the paging control channel (PCCH)). In some aspects, the base station can transmit a paging message intended for the UE using any suitable communication interface, such as a transceiver (e.g., transceiver 410).

At 914, if the UE is still within an area served by the base station ("YES" at 914), process 900 can return to 906, and the base station can receive another paging message from the core network. Otherwise, if the UE has left an area served by the base station (e.g., due to a handover, mobility outside of a RAN notification area, or for any other reason) ("NO" at 914), process 900 can end. Note that regardless of whether the UE is within the area served by the base station, the base station continues to periodically broadcast SIBs at 902, however, this is not illustrated to avoid overcomplicating the figure. In some aspects, the base station can determine whether the UE has left the area served by the base station using any suitable technique or combination of techniques. For example, the base station can receive a notification (e.g., from an access and mobility management function node (AMF)) indicating that the UE has left the RAN notification area (e.g., a message from the AMF indicating that the context associated with the UE is to be released). As another example, the base station can determine that the UE has left the area served by the base station based on a predetermined time having elapsed. In some aspects, 914 can be omitted (e.g., if the base station is in a RAN notification area associated with the UE, but does not have the UEs context).

Figure 10:
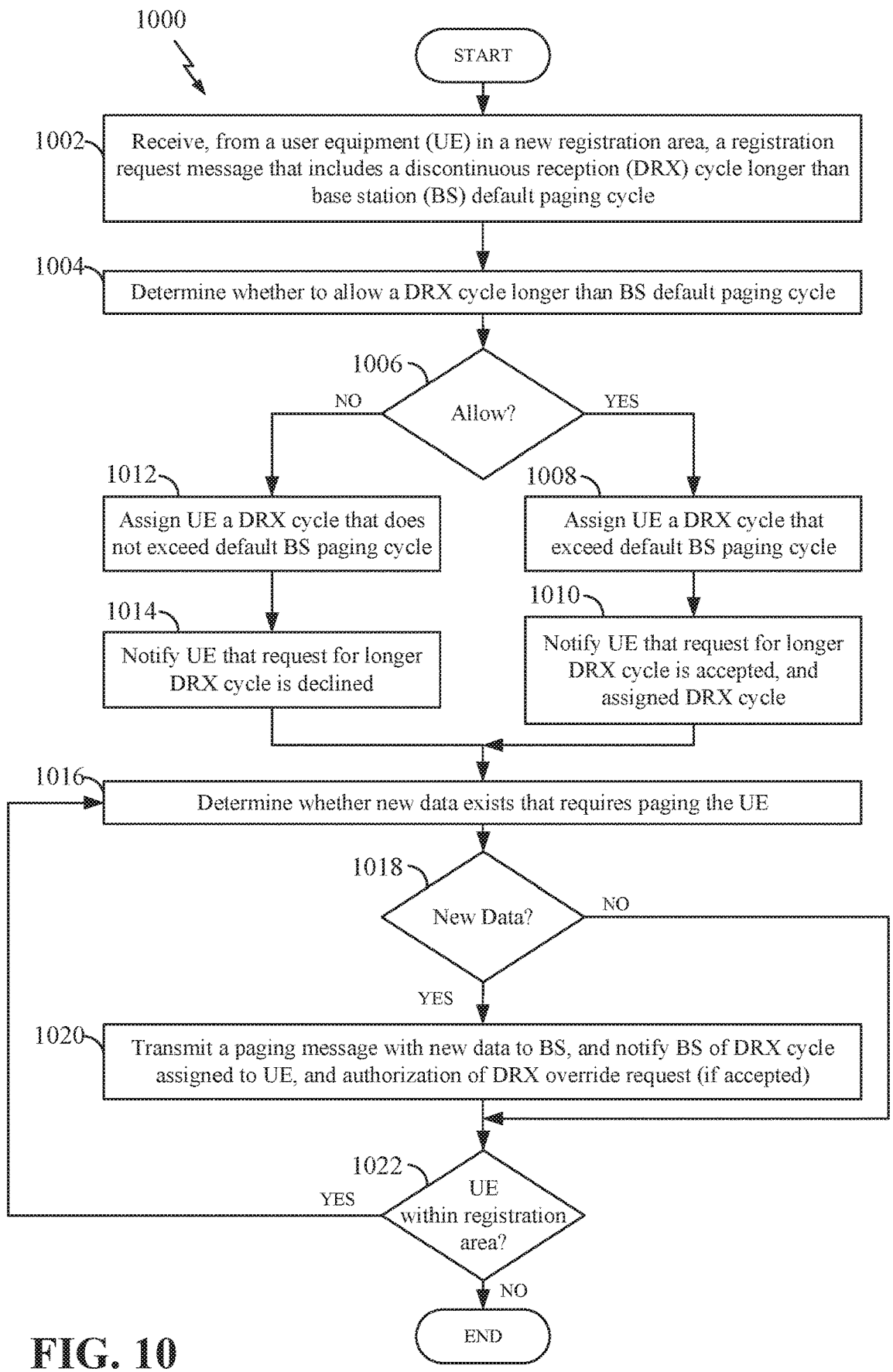
FIG. 10 is a flow chart illustrating an exemplary process for an access and mobility management function node to select a discontinuous reception cycle for a particular scheduled entity and override a default discontinuous reception cycle of scheduling entities in a registration area in accordance with some aspects of the disclosed subject matter.

FIG. 10 is a flow chart illustrating an exemplary process for an access and mobility management function node to select a discontinuous reception cycle for a particular scheduled entity and override a default discontinuous reception cycle of scheduling entities in a registration area in accordance with some aspects of the disclosed subject matter, and is described as an illustrative example without limitation. As described below, some or all illustrated features can be omitted in a particular implementation within the scope of the disclosed subject matter, and some illustrated features may not be required for implementation of all embodiments. In some examples, process 1000 can be carried out (e.g., executed) by an access and mobility management function node (AMF) described above in connection with FIG. 6, and/or a component of core network 102 described above in connection with FIG. 1. In some examples, process 1000 can be carried out by any suitable apparatus or means for carrying out the functions or algorithm described below.

At 1002, an AMF can receive, from a UE that is establishing a connection within a new registration area, a registration request message (which can be a Registration Request message defined according to one or more 5G standards, such as 3GPP Technical Specification 23.501) that includes a request a discontinuous reception (DRX) cycle that is longer than the default base station (BS) paging cycle. Additionally, in some aspects, the registration request message can include an explicit request to override the default DRX cycle of the base stations. For example, as described above in connection with 710 of FIG. 7, Registration Request transmitted by the UE and received by the AMF can include a requested DRX cycle (in any suitable format), and in some aspects, a Default DRX Override request. In some aspects, such a request can be received using the N1 interface, and can be communicated via a base station. In some aspects, the AMF can receive the Registration Request message using any suitable communication interface, such as an N1 interface (e.g., via network interface 616).

At 1004, an AMF can determine whether to allow a DRX cycle for the UE that is longer than the default paging cycle for one or more base stations in the registration area. In some aspects, the AMF can determine whether to allow a DRX cycle that exceeds the default paging interval based on any suitable factors, which may result in a DRX cycle that is shorter or longer than the default paging cycle. In some aspects, the AMF can determine whether to allow a DRX cycle for the UE that is longer than the default paging cycle based on various factors, such as load balancing.

If the AMF determines that a DRX cycle longer than the default paging cycle is allowed ("YES" at 1006), process 1000 can move to 1008. At 1008, an AMF can assign the UE a DRX cycle that exceeds the default paging cycle of one or more base stations in the registration area. As described above in connection with 712 of FIG. 7, the AMF can assign a DRX cycle that is somewhat longer or shorter than the DRX cycle requested at 1002 for various reasons, such as availability of a time slot corresponding to the requested DRX cycle, based on subscription of the scheduled entity, local configuration, latency requirements for a public warning system.

At 1010, an AMF can notify the UE of an accepted DRX cycle and an indication that a request to override the default DRX cycle has been accepted. In some aspects, the AMF can notify the UE by transmitting a registration accept message (which can be a Registration Accept message defined according to one or more 5G standards, such as 3GPP Technical Specification 23.501) that includes an accepted DRX cycle that is assigned to the UE by the core network (e.g., by the AMF). Additionally, in some aspects, the AMF can include an explicit indication that override of the default DRX of the base stations has been accepted in the registration accept message. For example, as described above in connection with 712 of FIG. 7, the AMF can transmit a Registration Accept message that includes an accepted DRX cycle (in any suitable format), and in some aspects, a Default DRX Override accept (if such a request was accepted), to the UE. In some aspects, such a message can be transmitted using the N1 interface (e.g., via network interface 616), and can be communicated via a base station that is in communication with the UE.

Otherwise, if the AMF determines that a DRX cycle longer than the default paging cycle is not allowed ("NO" at 1006), process 1000 can move to 1012. At 1012, an AMF can assign the UE a DRX cycle that does not exceed the default paging cycle of one or more base stations in the registration area.

At 1014, an AMF can notify the UE of an assigned DRX cycle and an indication that a request to override the default DRX cycle has not been accepted. In some aspects, the AMF can notify the UE by transmitting a registration accept message (which can be a Registration Accept message defined according to one or more 5G standards) that includes an assigned DRX cycle that is assigned to the UE by the core network (e.g., by the AMF). Additionally, in some aspects, the AMF can include an explicit indication that override of the default DRX of the base stations has not been accepted in the registration accept message. Note that in some aspects, the AMF can assign a DRX cycle that exceeds the default paging cycle, but explicitly indicate that override of the default DRX of the base stations has not been accepted. In some aspects, such a message can be transmitted using the N1 interface (e.g., via network interface 616), and can be communicated via a base station that is in communication with the UE.

At 1016, an AMF can determine whether any new data exists that requires paging the UE to communicate the new data to the UE. In some aspects, the AMF can determine whether any new data exists that requires paging using any suitable technique or combination of techniques. For example, if the AMF receives a new data notification and determines that the UE is not in a connected state (e.g., a state other than RRC_CONNECTED), the AMF can instruct the RAN associated with the UE to page the UE with the new data. As another example, the AMF can use techniques described above in connection with 720 of FIG. 7.

At 1018, if the AMF determines that new data exists that requires paging the UE ("YES" at 1018), process 1000 can move to 1020. At 1020, an AMF can transmit a paging message to a base station (or multiple base stations) that includes the new data for the UE, and can include the DRX cycle that has been assigned to the UE, and an indication that a default DRX override has been authorized (if the request was accepted). As described above in connection with 722 of FIG. 7, the AMF can transmit the paging message as an N2 message. In some aspects, the AMF can transmit the N2 message (e.g., via network interface 616) to all base stations within the UE's current tracking area. For example, this can cause each of the base stations to page the UE regardless of whether the UE is currently being serviced by a cell associated with that base station.

Otherwise, if the AMF determines that no new data exists that requires paging the UE ("NO" at 1018), process 1000 can move to 1022. At 1022, if the UE is still within the registration area ("YES" at 1022), process 1000 can return to 1016. Otherwise, if the UE has left the registration area ("NO" at 1022), process 1000 can end.

Example 1: A method, apparatus, system, and non-transitory computer-readable medium for wireless communication, comprising: transmitting, by a user equipment, a request for a discontinuous reception (DRX) cycle interval of a first duration; receiving, by the user equipment, an indication that a DRX cycle interval having a second duration has been assigned to the user equipment by a core network component; receiving, by the user equipment, a system information block (SIB) from a base station, the SIB comprising: a default paging cycle; and an indication that override of the default paging cycle is supported; entering, by the user equipment, an inactive state in which a transceiver of the user equipment is in a low power state; and causing, while the user equipment is in the inactive state and based on the indication that override of the default paging cycle is supported by the base station, the transceiver to periodically enter a higher power state to monitor its paging channel at a frequency based on the second duration.

Example 2: A method, apparatus, system, and non-transitory computer-readable medium of Example 1, wherein the request is a registration request message comprising: the first duration as a requested DRX cycle interval; and a default DRX override request.

Example 3: A method, apparatus, system, and non-transitory computer-readable medium of any one of Examples 1 to 2, wherein receiving the DRX cycle interval having the second duration comprises receiving a registration accept message comprising: the second duration; and a default DRX override accept.

Example 4: A method, apparatus, system, and non-transitory computer-readable medium of any one of Examples 1 to 3, wherein the first duration and the second duration are the same.

Example 5: A method, apparatus, system, and non-transitory computer-readable medium of any one of Examples 1 to 4, wherein the core network component is an access and mobility management function node (AMF).

Example 6: A method, apparatus, system, and non-transitory computer-readable medium of any one of Examples 1 to 5, wherein transmitting the request for the DRX cycle interval of the first duration comprises transmitting the request for the DRX cycle interval of the first duration in response to entering a new registration area.

Example 7: A method, apparatus, system, and non-transitory computer-readable medium of any one of Examples 1 to 6, wherein the SIB further comprises information indicative of a maximum DRX cycle duration supported by the base station, and further comprising: determining which of the second duration and the maximum DRX cycle duration supported by the base station is shorter; and setting the periodicity based on the second duration by selecting the shorter of the second duration and the maximum DRX cycle duration supported by the base station.

Example 8: A method, apparatus, system, and non-transitory computer-readable medium of any one of Examples 1 to 7, wherein the information indicative of a maximum DRX cycle duration supported by the base station comprises a maximum DRX cycle value provided via a maximum DRX cycle field.

Example 9: A method, apparatus, system, and non-transitory computer-readable medium of any one of Examples 1 to 8, wherein the information indicative of a maximum DRX cycle duration supported by the base station comprises a system information modification period, and further comprising: determining the maximum DRX cycle duration supported by the base station based on the system information modification period.

Example 10: A method, apparatus, system, and non-transitory computer-readable medium of any one of Examples 1 to 9, further comprising: receiving, by the user equipment, a second system information block (SIB) from a second base station, the second SIB comprising: a default paging cycle; and an indication that override of the default paging cycle is not supported; and_causing, while the user equipment is in the inactive state and based on the indication that override of the default paging cycle is not supported by the base station, the transceiver to periodically enter a higher power state to monitor its paging channel at a periodicity based on the default paging cycle.

Example 11: A method, apparatus, system, and non-transitory computer-readable medium of any one of Examples 1 to 10, wherein the indication that override of the default paging cycle is not supported comprises one or more of: a default DRX override value of false; a maximum DRX cycle duration value of zero; omission of a default DRX override value from the second SIB; or omission of a maximum DRX cycle duration value from the second SIB.

Example 12: A method, apparatus, system, and non-transitory computer-readable medium of any one of Examples 1 to 11, wherein the indication that override of the default paging cycle is supported comprises one or more of: a default DRX override value of true; or a non-zero maximum DRX cycle duration value.

Example 13: A method, apparatus, system, and non-transitory computer-readable medium of any one of Examples 1 to 12, further comprising: receiving, from a user equipment, a request for a discontinuous reception (DRX) cycle interval of a first duration; assigning, to the user equipment, a DRX cycle interval having a second duration; transmitting, to the user equipment, an indication that the DRX cycle interval having the second duration has been assigned to the user equipment; and transmitting, to a base station in a registration area in which the user equipment is located, a paging message comprising: an indication that the DRX cycle interval having the second duration has been assigned to the user equipment, and an indication that override of a default paging cycle of the base station is permitted.

Example 14: A method, apparatus, system, and non-transitory computer-readable medium of wireless communication, comprising: receiving, from a user equipment, a request for a discontinuous reception (DRX) cycle interval of a first duration; assigning, to the user equipment, a DRX cycle interval having a second duration; transmitting, to the user equipment, an indication that the DRX cycle interval having the second duration has been assigned to the user equipment; and transmitting, to a base station in a registration area in which the user equipment is located, a paging message comprising: an indication that the DRX cycle interval having the second duration has been assigned to the user equipment, and an indication that override of a default paging cycle of the base station is permitted.

Example 15: A method, apparatus, system, and non-transitory computer-readable medium of any one of Examples 1 to 14, wherein the request is a registration request message comprising: the first duration as a requested DRX cycle interval; and a default DRX override request.

Example 16: A method, apparatus, system, and non-transitory computer-readable medium of any one of Examples 1 to 15, wherein transmitting the DRX cycle interval having the second duration comprises transmitting a registration accept message comprising: the second duration; and a default DRX override accept.

Example 17: A method, apparatus, system, and non-transitory computer-readable medium of any one of Examples 1 to 16, wherein the first duration and the second duration are the same.

Example 18: A method, apparatus, system, and non-transitory computer-readable medium of any one of Examples 1 to 17, wherein assigning the DRX cycle interval having the second duration is performed by an access and mobility management function node (AMF), and wherein the paging message is an N2 message transmitted from the AMF to the base station.

Example 19: A method, apparatus, system, and non-transitory computer-readable medium of any one of Examples 1 to 18, further comprising: broadcasting, by a base station, a system information block (SIB), the SIB comprising: a default paging cycle; and an indication that override of the default paging cycle is supported; receiving, from a core network component, a paging message comprising: an indication that the DRX cycle interval having the second duration has been assigned to the user equipment; and an indication that override of a default paging cycle of the base station is permitted; and paging, based on the indication that override of the default paging cycle is permitted, the user equipment periodically at a periodicity based on the second duration.

Example 20: A method, apparatus, system, and non-transitory computer-readable medium of wireless communication, comprising: broadcasting, by a base station, a system information block (SIB), the SIB comprising: a default paging cycle; and an indication that override of the default paging cycle is supported; receiving, from a core network component, a paging message comprising: an indication that the DRX cycle interval having the second duration has been assigned to the user equipment; and an indication that override of a default paging cycle of the base station is permitted; and paging, based on the indication that override of the default paging cycle is permitted, the user equipment periodically at a periodicity based on the second duration.

Example 21: A method, apparatus, system, and non-transitory computer-readable medium of any one of Examples 1 to 20, wherein the paging message is an N2 message transmitted from an access and mobility management function node AMF to the base station.

Example 22: A method, apparatus, system, and non-transitory computer-readable medium of any one of Examples 1 to 21, the apparatus comprising: means for transmitting a request for a discontinuous reception (DRX) cycle interval of a first duration; means for receiving an indication that a DRX cycle interval having a second duration has been assigned to the user equipment by a core network component; means for receiving a system information block (SIB) from a base station, the SIB comprising: a default paging cycle; and an indication that override of the default paging cycle is supported; means for entering an inactive state in which a transceiver of the user equipment is in a low power state; and means for causing the transceiver to periodically enter a higher power state to monitor its paging channel at a periodicity based on the second duration while the wireless communication device is in the inactive state and based on the indication that override of the default paging cycle is supported by the base station.

Example 23: A system, comprising: means for transmitting a request for a discontinuous reception (DRX) cycle interval of a first duration; means for receiving an indication that a DRX cycle interval having a second duration has been assigned to the user equipment by a core network component; means for receiving a system information block (SIB) from a base station, the SIB comprising: a default paging cycle; and an indication that override of the default paging cycle is supported; means for entering an inactive state in which a transceiver of the user equipment is in a low power state; and means for causing the transceiver to periodically enter a higher power state to monitor its paging channel at a periodicity based on the second duration while the wireless communication device is in the inactive state and based on the indication that override of the default paging cycle is supported by the base station.

Example 24: A method, apparatus, system, and non-transitory computer-readable medium of any one of Examples 1 to 23, wherein the means for transmitting the request for the DRX cycle interval of the first duration is responsive to entering a new registration area.

Example 25: A method, apparatus, system, and non-transitory computer-readable medium of any one of Examples 1 to 24, wherein the system further comprises: means for determining which of the second duration and the maximum DRX cycle duration supported by the base station is shorter; and means for setting the periodicity based on the second duration by selecting the shorter of the second duration and the maximum DRX cycle duration supported by the base station.

Example 26: A method, apparatus, system, and non-transitory computer-readable medium of any one of Examples 1 to 25, wherein the system further comprises: means for receiving a second system information block (SIB) from a second base station, the second SIB comprising: a default paging cycle; and an indication that override of the default paging cycle is not supported; and means for causing, while the wireless communication device is in the inactive state and based on the indication that override of the default paging cycle is not supported by the base station, the transceiver to periodically enter a higher power state to monitor its paging channel at a periodicity based on the default paging cycle.

Example 27: A method, apparatus, system, and non-transitory computer-readable medium of any one of Examples 1 to 26, wherein the system further comprises: means for receiving a request for a discontinuous reception (DRX) cycle interval of a first duration from a user equipment; means for assigning a DRX cycle interval having a second duration to the user equipment; means for transmitting an indication that the DRX cycle interval having the second duration has been assigned to the user equipment to the user equipment; and means for transmitting a paging message to a base station in a registration area in which the user equipment is located, the paging message comprising: an indication that the DRX cycle interval having the second duration has been assigned to the user equipment, and an indication that override of a default paging cycle of the base station is permitted.

Example 28: A system, comprising: means for receiving a request for a discontinuous reception (DRX) cycle interval of a first duration from a user equipment; means for assigning a DRX cycle interval having a second duration to the user equipment; means for transmitting an indication that the DRX cycle interval having the second duration has been assigned to the user equipment to the user equipment; and means for transmitting a paging message to a base station in a registration area in which the user equipment is located, the paging message comprising: an indication that the DRX cycle interval having the second duration has been assigned to the user equipment, and an indication that override of a default paging cycle of the base station is permitted.

Example 29: A method, apparatus, system, and non-transitory computer-readable medium of any one of Examples 1 to 28, wherein the system further comprises: means for broadcasting a system information block (SIB), the SIB comprising: a default paging cycle; and an indication that override of the default paging cycle is supported; means for receiving a paging message from a core network component, the paging message comprising: an indication that the DRX cycle interval having the second duration has been assigned to the user equipment; and an indication that override of a default paging cycle of the base station is permitted; and means for paging the user equipment periodically at a periodicity based on the second duration.

Example 30: A system, comprising: means for broadcasting a system information block (SIB), the SIB comprising: a default paging cycle; and an indication that override of the default paging cycle is supported; means for receiving a paging message from a core network component, the paging message comprising: an indication that the DRX cycle interval having the second duration has been assigned to the user equipment; and an indication that override of a default paging cycle of the base station is permitted; and means for paging the user equipment periodically at a periodicity based on the second duration.

Example 31: A wireless communication device, comprising: means for transmitting a request for a discontinuous reception (DRX) cycle interval of a first duration; means for receiving an indication that a DRX cycle interval having a second duration has been assigned to the user equipment by a core network component; means for receiving a system information block (SIB) from a base station, the SIB comprising: a default paging cycle; and an indication that override of the default paging cycle is supported; means for entering an inactive state in which a transceiver of the user equipment is in a low power state; and means for causing the transceiver to periodically enter a higher power state to monitor its paging channel at a periodicity based on the second duration while the wireless communication device is in the inactive state and based on the indication that override of the default paging cycle is supported by the base station.

Example 32: A wireless communication device of Example 31, wherein the means for transmitting the request for the DRX cycle interval of the first duration is responsive to entering a new registration area.

Example 33: A wireless communication device of any one of Examples 31 and 32, wherein the SIB further comprises information indicative of a maximum DRX cycle duration supported by the base station, and wherein the wireless communication device further comprises: means for determining which of the second duration and the maximum DRX cycle duration supported by the base station is shorter;

and means for setting the periodicity based on the second duration by selecting the shorter of the second duration and the maximum DRX cycle duration supported by the base station.

Example 34: A wireless communication device of any one of Examples 31 to 33, further comprising: means for receiving a second system information block (SIB) from a second base station, the second SIB comprising: a default paging cycle; and an indication that override of the default paging cycle is not supported; and means for causing, while the wireless communication device is in the inactive state and based on the indication that override of the default paging cycle is not supported by the base station, the transceiver to periodically enter a higher power state to monitor its paging channel at a periodicity based on the default paging cycle.

Example 35: A core network component, comprising: means for receiving a request for a discontinuous reception (DRX) cycle interval of a first duration from a user equipment; means for assigning a DRX cycle interval having a second duration to the user equipment; means for transmitting an indication that the DRX cycle interval having the second duration has been assigned to the user equipment to the user equipment; and means for transmitting a paging message to a base station in a registration area in which the user equipment is located, the paging message comprising: an indication that the DRX cycle interval having the second duration has been assigned to the user equipment, and an indication that override of a default paging cycle of the base station is permitted.

Example 36: A scheduling entity, comprising: means for broadcasting a system information block (SIB), the SIB comprising: a default paging cycle; and an indication that override of the default paging cycle is supported; means for receiving a paging message from a core network component, the paging message comprising: an indication that the DRX cycle interval having the second duration has been assigned to the user equipment; and an indication that override of a default paging cycle of the base station is permitted; and means for paging the user equipment periodically at a periodicity based on the second duration.

Example 37: A scheduling entity of Example 36, wherein the SIB further comprises information indicative of a maximum DRX cycle duration supported by the base station, and wherein the scheduling entity further comprises: means for determining which of the second duration and the maximum DRX cycle duration supported by the base station is shorter; and means for setting the periodicity based on the second duration by selecting the shorter of the second duration and the maximum DRX cycle duration supported by the base station.

Example 38: A system comprising one or more of: a wireless communication device of any one of Examples 31 to 34, a core network component of Example 35, and/or a scheduling entity of any one of Examples 36 and 37.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 can be rearranged and/or combined into a single component, step, feature or function or embodied in several components, steps, or functions. Additional elements, components, steps, and/or functions can also be added without departing from novel features disclosed herein. The apparatus, devices, and/or components illustrated in FIGS. 1-10 can be configured to perform one or more of the methods, features, or steps described herein. The novel algorithms described herein can also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods can be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   transmitting, by a user equipment when the user equipment enters a new registration area, a registration request message comprising a request for an idle discontinuous reception (I-DRX) cycle interval of a first duration;
   receiving, by the user equipment, a registration accept message comprising an indication that an I-DRX cycle interval having a second duration has been assigned to the user equipment by a core network component;
   receiving, by the user equipment when the user equipment enters a new serving cell, a system information block (SIB) from a base station, the SIB comprising:
      a default I-DRX paging cycle;
      information indicative of a maximum I-DRX cycle duration supported by the base station, the information indicative of the maximum I-DRX cycle duration supported by the base station comprising a system information modification period; and
      an indication that override of the default I-DRX paging cycle is supported;
   determining, by the user equipment, the maximum I-DRX cycle duration supported by the base station based on the system information modification period;
   determining, by the user equipment, which of the second duration or the maximum I-DRX cycle duration supported by the base station is shorter;
   setting, by the user equipment, a periodicity based on the second duration by selecting the shorter of the second duration or the maximum I-DRX cycle duration supported by the base station;
   entering, by the user equipment, a Radio Resource Control Idle (RRC_IDLE) state in which a transceiver of the user equipment is in a low power state; and
   causing, while the user equipment is in the RRC_IDLE state and based on the indication that override of the default I-DRX paging cycle is supported by the base station, the transceiver to periodically enter a higher power state to monitor its paging channel at the periodicity.

2. The method of claim 1, wherein the registration request message further comprises:
   the first duration as a requested I-DRX cycle interval; and
   a default I-DRX override request.

3. The method of claim 1, wherein the registration accept message further comprises:
   the second duration; and
   a default I-DRX override accept.

4. The method of claim 3, wherein the first duration and the second duration are the same.

5. The method of claim 1, wherein the core network component is an access and mobility management function node (AMF).

6. The method of claim 1, further comprising:
   receiving, by the user equipment, a second system information block (SIB) from a second base station, the second SIB comprising:
      a default I-DRX paging cycle associated with the second base station; and
      an indication that override of the default I-DRX paging cycle associated with the second base station is not supported; and
   causing, while the user equipment is in the RRC_IDLE state and based on the indication that override of the default I-DRX paging cycle is not supported by the base station, the transceiver to periodically enter the higher power state to monitor its paging channel at a periodicity based on the default I-DRX paging cycle.

7. The method of claim 6, wherein the indication that override of the default I-DRX paging cycle associated with the second base station is not supported comprises one or more of:
   a default I-DRX override value of false; a maximum I-DRX cycle duration value of zero; omission of a default I-DRX override value from the second SIB; or omission of a maximum I-DRX cycle duration value from the second SIB.

8. The method of claim 1, wherein the indication that override of the default I-DRX paging cycle is supported comprises one or more of:
   a default I-DRX override value of true; or a non-zero maximum I-DRX cycle duration value.

9. A wireless communication device, comprising:
   a transceiver;
   memory; and
   a processor communicatively coupled to the transceiver and the memory, the processor configured to:
      when the wireless communication device enters a new registration area, transmit a registration request message comprising a request for an idle discontinuous reception (I-DRX) cycle interval of a first duration;
      receive a registration accept message comprising an indication that an I-DRX cycle interval having a second duration has been assigned to the wireless communication device by a core network component;
      when the wireless communication device enters a new serving cell, receive a system information block (SIB) from a base station, the SIB comprising:
         a default I-DRX paging cycle;
         information indicative of a maximum I-DRX cycle duration supported by the base station, the information indicative of the maximum I-DRX cycle duration supported by the base station comprising a system information modification period; and
         an indication that override of the default I-DRX paging cycle is supported;
      determine the maximum I-DRX cycle duration supported by the base station based on the system information modification period;
      determine which of the second duration or the maximum I-DRX cycle duration supported by the base station is shorter;
      set a periodicity based on the second duration by selecting the shorter of the second duration or the maximum I-DRX cycle duration supported by the base station;
      enter a Radio Resource Control Idle (RRC_IDLE) state in which the transceiver is in a low power state; and
      cause, while the wireless communication device is in the RRC_IDLE state and based on the indication that override of the default I-DRX paging cycle is supported by the base station, the transceiver to periodically enter a higher power state to monitor its paging channel at the periodicity.

10. The wireless communication device of claim 9, wherein registration request message further comprises:
the first duration as a requested I-DRX cycle interval; and
a default I-DRX override request.

11. The wireless communication device of claim 9, wherein the registration accept message further comprises:
the second duration; and
a default I-DRX override accept.

12. The wireless communication device of claim 11, wherein the first duration and the second duration are the same.

13. The wireless communication device of claim 9, wherein the core network component is an access and mobility management function node (AMF).

14. The wireless communication device of claim 9, wherein the processor is further configured to:
receive a second system information block (SIB) from a second base station, the second SIB comprising:
a default I-DRX paging cycle associated with the second base station; and
an indication that override of the default I-DRX paging cycle associated with the second base station is not supported; and
cause, while the wireless communication device is in the RRC_IDLE state and based on the indication that override of the default I-DRX paging cycle is not supported by the base station, the transceiver to periodically enter the higher power state to monitor its paging channel at a periodicity based on the default I-DRX paging cycle.

15. The wireless communication device of claim 14, wherein the indication that override of the default I-DRX paging cycle associated with the second base station is not supported comprises one or more of:
a default I-DRX override value of false; a maximum I-DRX cycle duration value of zero; omission of a default I-DRX override value from the second SIB; or omission of a maximum I-DRX cycle duration value from the second SIB.

16. The wireless communication device of claim 9, wherein the indication that override of the default I-DRX paging cycle is supported comprises one or more of:
a default I-DRX override value of true; or a non-zero maximum I-DRX cycle duration value.

* * * * *